United States Patent
Kim et al.

(10) Patent No.: US 9,750,382 B2
(45) Date of Patent: Sep. 5, 2017

(54) ROBOT CLEANER, ROBOT CLEANER SYSTEM AND CONTROL METHOD OF THE SAME

(71) Applicant: LG ELECTRONICS INC., Seoul (KR)

(72) Inventors: Bongju Kim, Seoul (KR); Suuk Choe, Seoul (KR); Sunghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/583,954

(22) Filed: Dec. 29, 2014

(65) Prior Publication Data

US 2015/0182088 A1 Jul. 2, 2015

(30) Foreign Application Priority Data

Dec. 27, 2013 (KR) ........................ 10-2013-0166218

(51) Int. Cl.
- *A47L 9/28* (2006.01)
- *A47L 11/40* (2006.01)
- *G05D 1/00* (2006.01)

(52) U.S. Cl.
CPC ......... *A47L 11/4011* (2013.01); *A47L 9/2894* (2013.01); *G05D 1/0044* (2013.01);
(Continued)

(58) Field of Classification Search
CPC ...... A47L 9/2842; A47L 9/2852; A47L 9/009; A47L 9/2805; A47L 9/2894;
(Continued)

(56) References Cited

U.S. PATENT DOCUMENTS

| 6,732,826 B2* | 5/2004 | Song ...................... A47L 9/009 15/340.1 |
| 9,008,835 B2* | 4/2015 | Dubrovsky .......... G05B 19/409 700/245 |

(Continued)

FOREIGN PATENT DOCUMENTS

| CN | 1493246 | 5/2004 |
| CN | 102053623 | 5/2011 |

(Continued)

OTHER PUBLICATIONS

European Search Report dated Sep. 9, 2015 issued in Application No. 14199902.9.

(Continued)

*Primary Examiner* — Dung Van Nguyen
(74) *Attorney, Agent, or Firm* — KED & Associates LLP

(57) ABSTRACT

A robot cleaner includes a case, a suction device provided in the case, a suction nozzle for sucking dust from a floor by driving of the suction device, a dust collection device for collecting foreign substances contained in the air sucked via the suction nozzle, a driving unit for allowing the case to drive automatically, a controller for controlling the driving of the suction device and the driving unit, and for generating cleaning history information comprising map information on a cleaning area and moving path information, a memory unit for storing the cleaning history information; and a wireless communication module provided in the case to transmit the cleaning history information to the external terminal, when the external terminal asks the cleaning history information.

10 Claims, 13 Drawing Sheets

(52) U.S. Cl.
CPC ....... *A47L 2201/04* (2013.01); *A47L 2201/06* (2013.01); *G05D 2201/0203* (2013.01)

(58) Field of Classification Search
CPC ............. A47L 2201/06; A47L 2201/04; A47L 11/4011; B60L 11/1833; B60L 11/1861; G05D 1/0203
See application file for complete search history.

(56) References Cited

U.S. PATENT DOCUMENTS

| | | | |
|---|---|---|---|
| 2003/0120389 A1* | 6/2003 | Abramson | A47L 5/22 700/245 |
| 2004/0083570 A1* | 5/2004 | Song | A47L 9/009 15/319 |
| 2004/0088080 A1 | 5/2004 | Song et al. | |
| 2005/0171644 A1 | 8/2005 | Tani | |
| 2006/0069465 A1 | 3/2006 | Saeki | |
| 2010/0076600 A1* | 3/2010 | Cross | H04N 7/15 700/259 |
| 2011/0264305 A1 | 10/2011 | Choe | |
| 2012/0260944 A1 | 10/2012 | Martins, Jr. | |
| 2013/0056032 A1 | 3/2013 | Choe et al. | |
| 2013/0203346 A1 | 8/2013 | Han | |
| 2013/0206177 A1 | 8/2013 | Burlutskiy | |
| 2013/0237148 A1 | 9/2013 | McCann et al. | |
| 2015/0039127 A1 | 2/2015 | Matsumoto et al. | |
| 2015/0151646 A1 | 6/2015 | Noiri | |

FOREIGN PATENT DOCUMENTS

| | | |
|---|---|---|
| CN | 103142188 | 6/2013 |
| EP | 2 330 471 | 6/2011 |
| JP | 2013-146314 | 8/2013 |
| JP | 2013-233229 | 11/2013 |
| JP | 2013-242738 | 12/2013 |
| KR | 10-2013-00298 52 | 3/2013 |
| WO | WO 2013/108479 A1 | 7/2013 |

OTHER PUBLICATIONS

Chinese Office Action for Application 201410830008.0 dated Aug. 29, 2016 (full Chinese text and full English translation).
Wikipedia, Near-field Communication, Jul. 3, 2013, Wikipedia, The Free Encyclopedia.

* cited by examiner

ROBOT CLEANER, ROBOT CLEANER SYSTEM AND CONTROL METHOD OF THE SAME

CROSS-REFERENCE TO RELATED APPLICATION(S)

This application claims priority under 35 U.S.C. §119(a) to Korean Application No. 10-2013-0166218, filed on Dec. 27, 2013, whose entire disclosure is hereby incorporated by reference.

BACKGROUND

1. Field

The present disclosure relates to a robot cleaner, a robot cleaner system and a control method of the same, more particularly, to a robot cleaner of which a cleaning history may be figured out easily by a user through an external terminal, a robot cleaner system and a control method of the same.

2. Background

A robot cleaner is an electric home appliance for cleaning a floor or carpet of a room. The robot cleaner includes an air suction device provided in a cleaner case and the air suction device consists of a motor and a fan. After sucking external air containing foreign matters by driving the air suction device, the robot cleaner separates the foreign matters to collect dust and exhausts the clean air having foreign substances separated there from.

A vacuum cleaner may include a manual vacuum cleaner directly operated by a user and a robot cleaner that performs cleaning for itself, without user's operation.

The robot cleaner sucks foreign matters (e.g., dust) from the floor in a region set to clean, while driving the region itself. Also, the robot may perform cleaning, while automatically driving a cleaning region with using an obstacle sensor or while manually driving via a remote control device wirelessly linked to the robot cleaner.

However, it is difficult to expand controlling of the robot cleaner using the remote control. In other words, it is difficult to input other functions through the remote control, except the input set in the remote control. Methods for controlling a robot cleaner through a smart phone, not a remote control exclusively used for the robot cleaner are on the rise.

Recently, a robot cleaner having a camera module mounted therein is provided and such a camera module may generate image information on a room. Accordingly, the security of the robot cleaner can be important. When the robot cleaner is hacked from outside, image information about a room may be exposed to a hacker via a camera module.

As a result, a robot cleaner and a robot cleaner system including the same need to be provided which can be controlled by the user easily via a smart phone, with an enhanced security performance.

Meanwhile, such the robot cleaner generally performs cleaning, while automatically driving. In many instances, even when the user is away from home, the robot cleaner cleans the room, while driving automatically. In other words, the robot cleaner may not often perform cleaning in accordance with the user's direct operation.

Accordingly, it is difficult for the user to check whether the robot cleaner performs cleaning or not. It is also difficult to notice whether the robot cleaner completes the cleaning through the house, in other words, an overall cleaning area to the user.

BRIEF DESCRIPTION OF THE DRAWINGS

The embodiments will be described in detail with reference to the following drawings in which like reference numerals refer to like elements wherein.

DETAILED DESCRIPTION

Exemplary embodiments of the disclosed subject matter are described more fully hereinafter with reference to the accompanying drawings. The disclosed subject matter may, however, be embodied in many different forms and should not be construed as limited to the exemplary embodiments set forth herein.

Exemplary embodiments of the disclosed subject matter are described herein with reference to cross-region illustrations that are schematic illustrations of idealized embodiments (and intermediate structures) of the disclosed subject matter. As such, variations from the shapes of the illustrations as a result, for example, of manufacturing techniques and/or tolerances, are to be expected. Thus, exemplary embodiments of the disclosed subject matter should not be construed as limited to the particular shapes of regions illustrated herein but are to include deviations in shapes that result, for example, from manufacturing.

Referring to FIGS. 1 through 4, a structure of the robot cleaner composing the robot cleaner system will be described.

Figure 1:
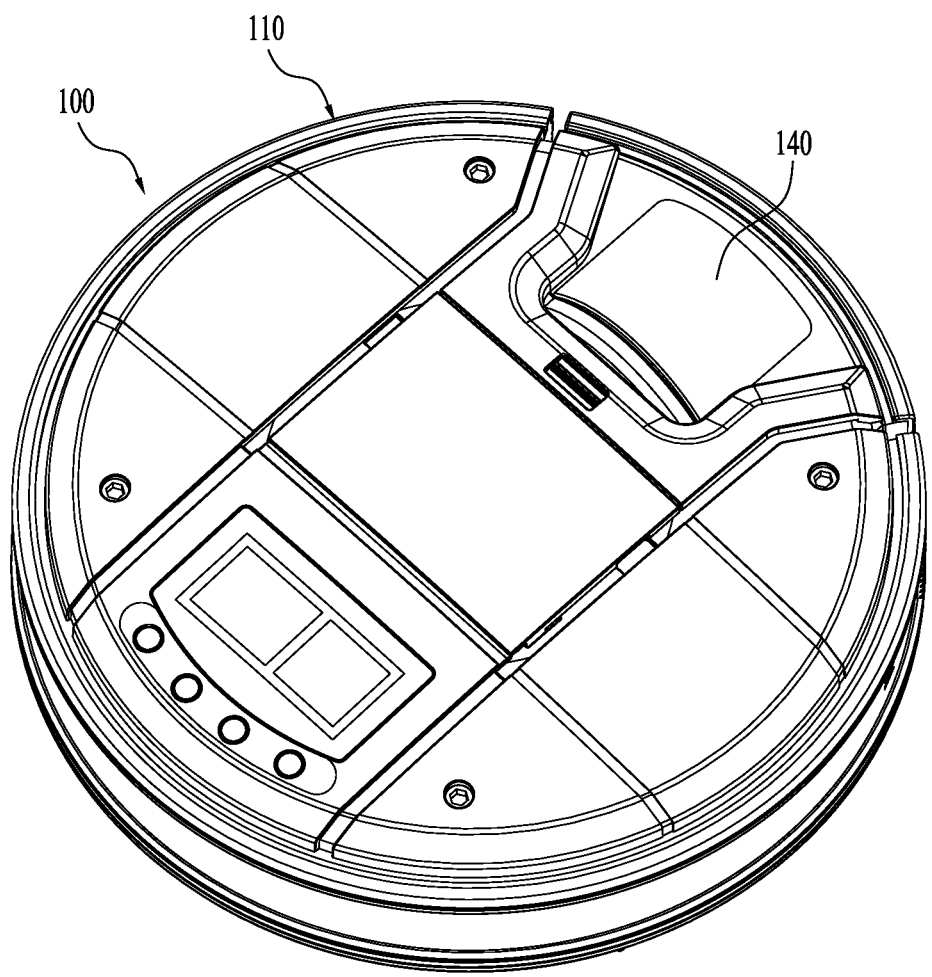
FIG. 1 is a perspective diagram illustrating a robot cleaner according to one embodiment of the disclosure.
Figure 2:
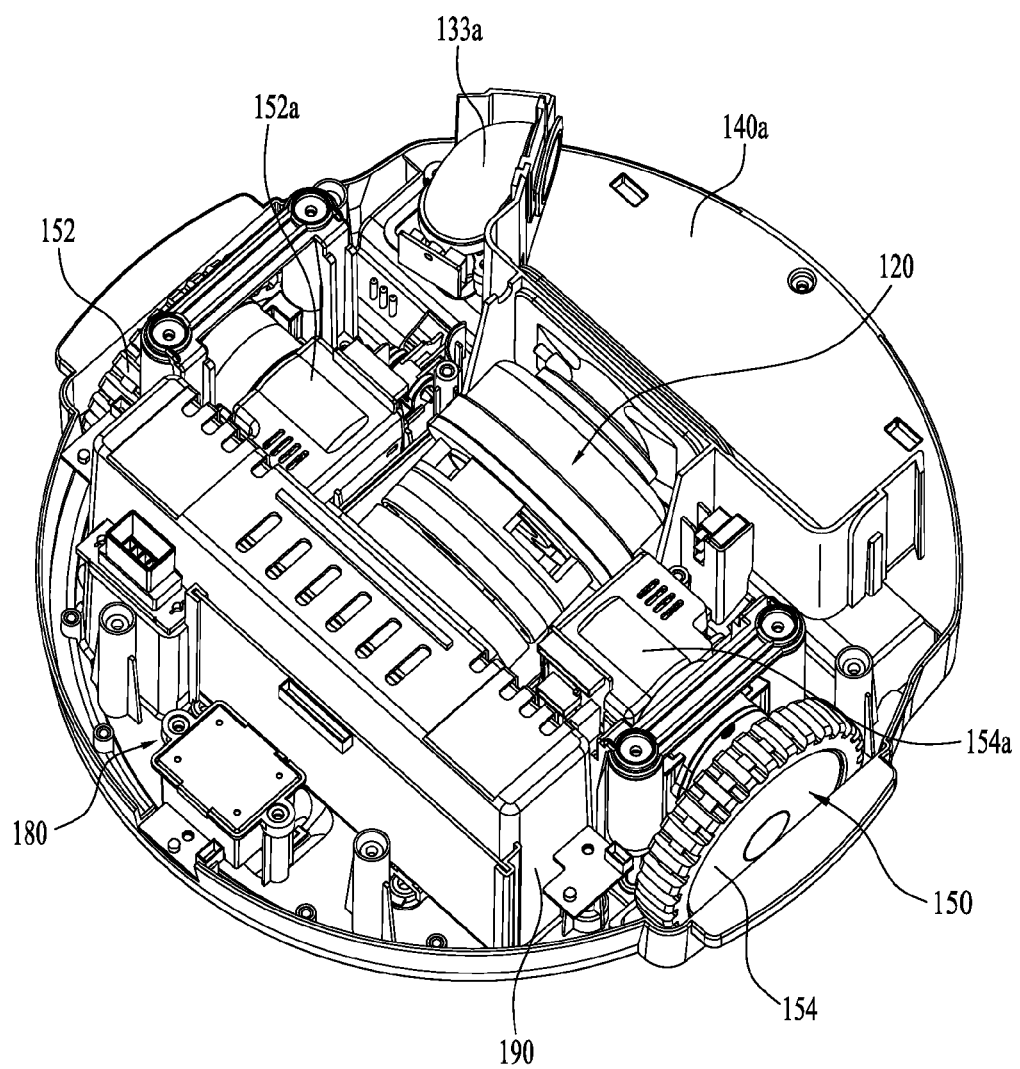
FIG. 2 is a perspective diagram illustrating an inner structure of the robot cleaner according to one embodiment of the disclosure.
Figure 3:
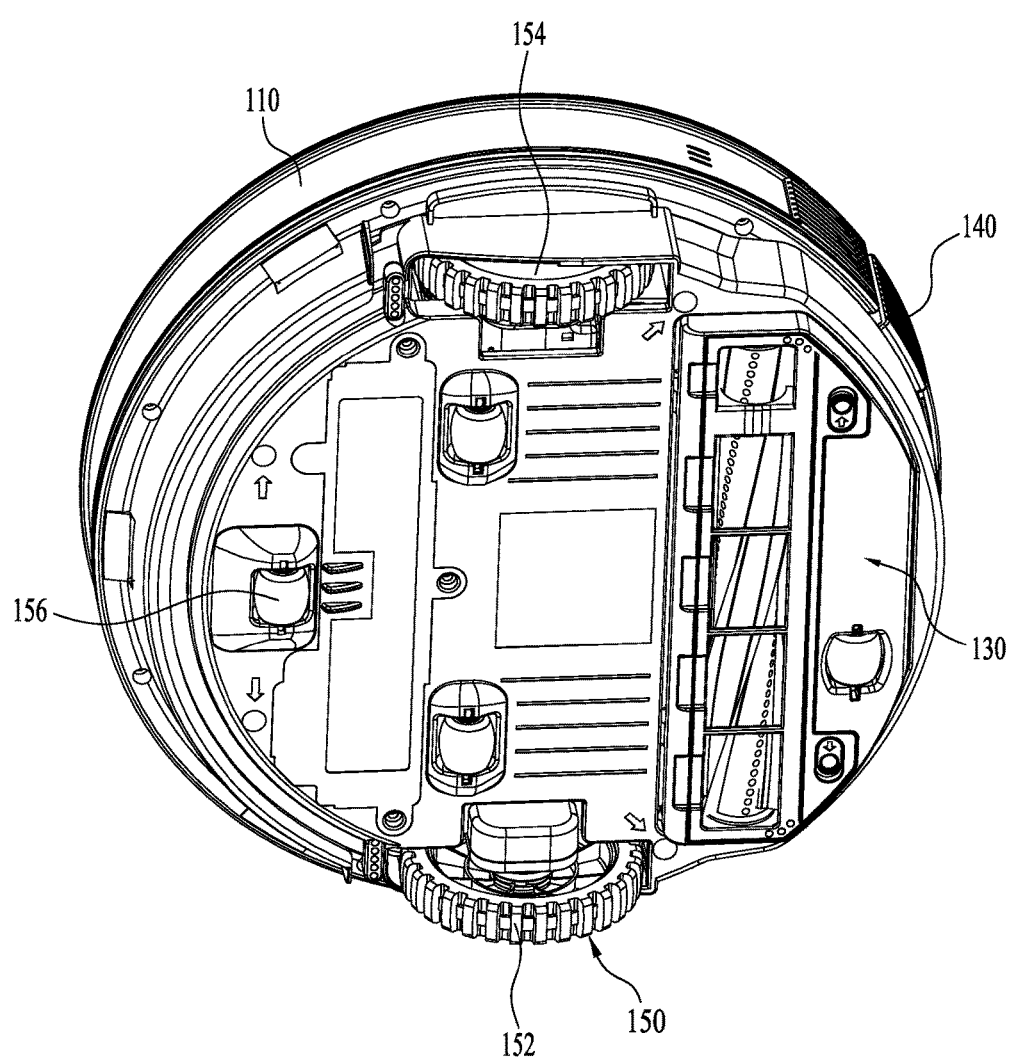
FIG. 3 is a lower perspective diagram of the robot cleaner according to one embodiment of the disclosure.
Figure 4:
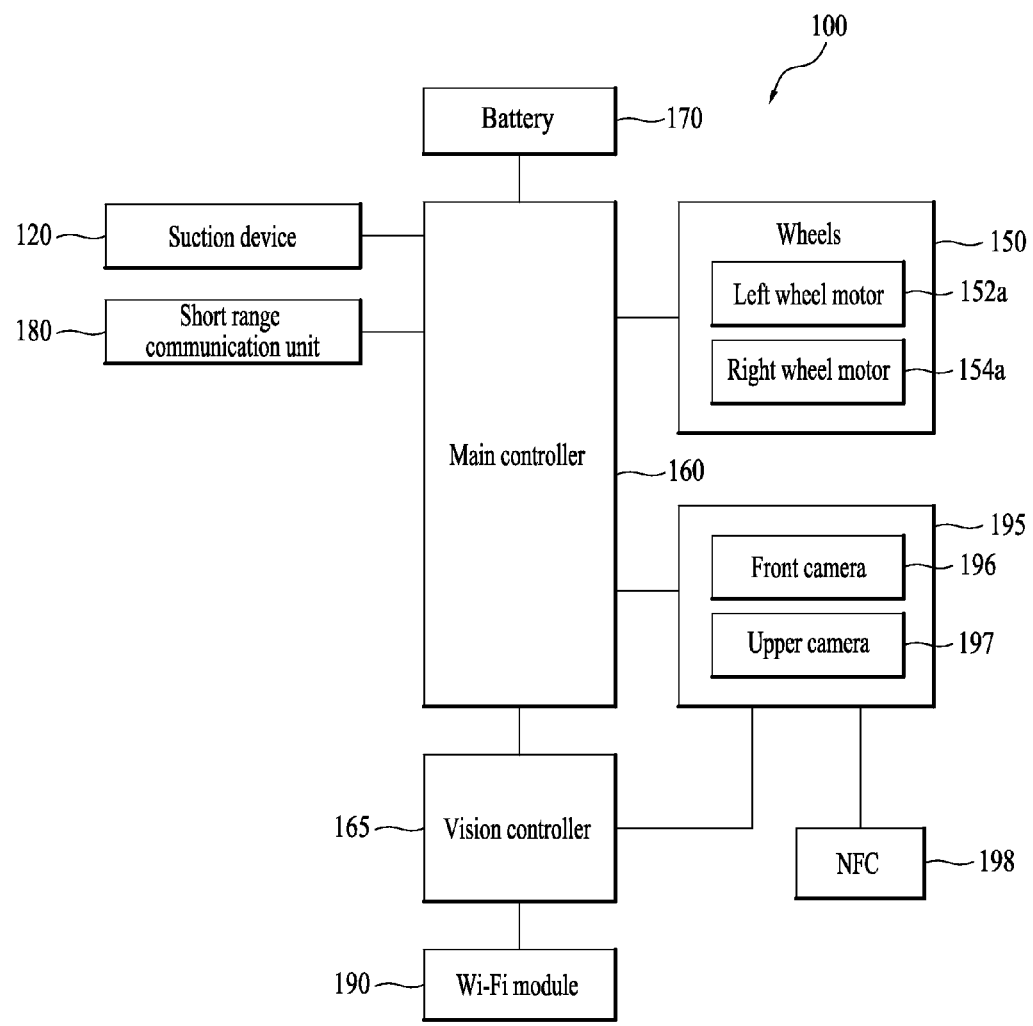
FIG. 4 is a block diagram of a robot cleaner composing a robot cleaner system according to one embodiment of the disclosure.

FIG. 1 is a perspective diagram illustrating a robot cleaner according to one embodiment of the disclosure. FIG. 2 is a perspective diagram illustrating an inner structure of the robot cleaner according to one embodiment of the disclosure. FIG. 3 is a lower perspective diagram of the robot cleaner according to one embodiment of the disclosure. FIG. 4 is a block diagram of a robot cleaner composing a robot cleaner system according to one embodiment of the disclosure.

The robot cleaner 100 may include a cleaner case 110 that defines an exterior appearance of the robot cleaner 100, a suction device 120 provided in the cleaner case 110, a suction nozzle 130 configured to suck dust on the floor via the driving of the suction device 120 and a dust collector 140 configured to collect foreign matters from the sucked air.

The cleaner case 110 of the robot cleaner 100 may be formed in a cylinder shape with a relatively smaller height than a diameter, in other words, a flat cylinder shape. It may have a square shape with circular corners. In the cleaners 110 may be provided the suction device 120, the suction nozzle 130 and the dust collector 140 in communication with the suction nozzle 130.

In an outer circumferential surface of the cleaner case 110 may be provided a sensor (not shown) configured to sense a distance to a wall or an obstacle in a room, a bumper (not shown) configured to damp a shock generated by collision and a driving 150 configured to move the robot cleaner 100. The driving unit 150 may be projected to the outside from in inside of the case 110, especially, a floor of the room.

The driving unit 150 may consist of a left driving wheel 152 and a right driving wheel 154 which are installed in both lower portions of the cleaner case 110, respectively. the left and right driving wheels 152 and 154 are configured to be rotated by a left wheel motor 152a and a right wheel motor 154a controllable by a cleaner controller 160, respectively, such that the robot cleaner 100 can change a direction in accordance with the driving of the left and right wheel motors 152a and 154a automatically, while performing room-clean.

At least one auxiliary wheel 156 may be provided in a bottom of the cleaner case 110 and the auxiliary wheel 156 may minimize friction between the robot cleaner 100 and the floor and guide the motion of the robot cleaner 100 simultaneously.

FIG. 4 is a block diagram of a cleaner controller 160 provided in the robot cleaner 100. The cleaner controller 160 linked to various components of the robot cleaner 100 to control the driving of the robot cleaner 100 may be provided in the cleaner case 110, for example, a front portion inside the robot case 110. Also, a battery 170 configured to supply a power to the suction device 120 may be provided in the cleaner case 110, for example, a rear portion inside the robot case 110.

The suction device 120 configured to generate an air suction force may be provided behind the battery 170 and the dust collector 140 may be detachably coupled to a rear portion of a dust collector coupling part provided in a rear portion of the suction device 120.

The suction nozzle 130 may be provided under the dust collector 140 and it may suck foreign matters with air. The suction device 120 may include a fan (not shown) inclinedly installed between the battery 170 and the dust collector 140, with being connected to a motor (not shown) electrically connected to the battery 170 and a shaft of the motor to blow air.

Meanwhile, the suction nozzle 130 may be exposed to a bottom of the cleaner case 110 via a hole (not shown) formed in the bottom of the cleaner case 110, only to contact with the floor of the room.

To control the robot cleaner 100 from a distance, the robot cleaner 100 according to this embodiment may include a wireless communication unit or wireless module 190 that can wirelessly communicate with an external device. Specifically, the wireless communication unit may be Wi-Fi module.

The wireless communication unit 190 may be configured to communicate with an external terminal via Wi-Fi. At this time, the external terminal may be a smart phone having a Wi-Fi module mounted therein and such the external terminal will be described later.

Wi-Fi (Wireless LAN) means short range communication which can wirelessly communicate in a preset short range in a place where AP (Access Point) is installed, using a radio wave or an infrared transmission. Accordingly, the wireless communication unit 190 may be the Wi-Fi module 190 configured to enable Wi-Fi communication with the external terminal.

At this time, the Wi-Fi module 190 may provide AP. In other words, AP may be embedded in the robot cleaner. The external device may directly connect to AP of the robot cleaner, not connecting via an external AP such as an internet router. Accordingly, easy and smooth wireless communication may be performed between the robot cleaner and the external terminal, regardless of external communication environment.

To directly perform Wi-Fi communication with the robot cleaner, the external terminal needs authentication to connect to the AP. The external terminal has to figure out information on the robot cleaner and it connects to the AP via the robot cleaner information to get authentication.

The robot cleaner information may include the AP information. The AP information may include SSID (Service Set Identifier) of the AP and the AP information may also include a nick name of the robot cleaner. The AP information may include a security key for access authentication.

The external terminal may access to the robot cleaner via the AP information and Wi-Fi communicate with the robot cleaner after getting authentication, such that the external terminal can control the robot cleaner. In this instance, the controlling of the robot cleaner may include remote-controlling of the driving of the robot cleaner and monitoring of state information on the robot cleaner. Also, the controlling of the robot cleaner may include receiving of the diverse information figured out in the robot cleaner from the external terminal.

For example, to control the robot cleaner, a current state of the robot cleaner may be monitored. In other words, it is monitored whether cleaning is performed or ended or in which cleaning mode the robot cleaner performed cleaning. A cleaning history may be figured out through the external terminal easily, which will be described later.

Accordingly, the robot cleaner may include a memory unit 161. The memory unit 161 may store cleaning history information. Such cleaning history information may be generated whenever cleaning is performed. When the external terminal requests, the cleaning history information may be transmitted to the external terminal, such that the user may figure out the cleaning history information through the external terminal easily.

As mentioned above, the robot cleaner according to this embodiment supplies self AP to Wi-Fi-communicate with the external terminal directly. In other words, the robot cleaner can Wi-Fi communicate with the external terminal directly, not via external AP.

The robot cleaner may include a camera module 195. Using the camera 195, diverse image information on a room may be generated. Also, a map may be created through the camera 195. In other words, a cleaning map corresponding to a cleaning area may be created. Such a map may be made when an initial cleaning is performed and the created map may be modified continuously. That is because furniture arrangement could be changed in a house or a not obstacle can be placed. The cleaning map corresponding to the cleaning area may be generated.

Specifically, the camera 195 may include a front camera 196 and an upper camera 197. The image information achieved through the camera module 195 may be transmitted to the external terminal. For example, the user may control the robot cleaner, while viewing image information displayed on the external terminal.

If the robot cleaner and the external terminal are in Wi-Fi communication via AP in the house, there is concern about weak security. In other words, when AP information in the house is exposed to a stranger, he or she might control the robot cleaner discretionarily. That means that a stranger could acquire the indoor image information through the robot cleaner discretionarily.

Accordingly, the robot cleaner according to this embodiment may directly Wi-Fi communicate with the external terminal, only to overcome such a security problem. The external terminal and the robot cleaner may Wi-Fi communicate with each other directly through the AP provided by the robot cleaner. That means that the user may directly control the robot cleaner through the external terminal in a preset range of communication areas.

In addition, wireless communication is easily enabled even in an area where wireless communication via AP in a house or wireless communication via an external network is not smooth.

As mentioned above, AP information has to be transmitted to the external terminal to access to the AP of the robot cleaner through the external terminal. For example, the user needs to input the AP information to the external terminal one by one.

However, it is hard or not easy for the user to memorize or directly input AP information. Accordingly, such AP information needs transmitting to the external terminal easily.

The robot cleaner according to this embodiment may include a NFC module having AP information on self AP. Specifically, AP information including SSID of AP is recorded in the NFC module 198 and such the AP information may be provided to the external terminal. A NFC module 198 corresponding to the NFC module 198 of the robot cleaner may be provided even in the external terminal.

The user may execute a specific application to control the robot cleaner through the external terminal. In this process, a process of registering a robot cleaner to control in the external terminal.

For that, the user locates the external terminal near the NFC module 198 of the robot cleaner, such that the AP information of the robot cleaner can be transmitted to the external terminal via NFC communication. When such the AP information is registered in the external terminal, the robot cleaner to control is specified.

Once the user selects the robot cleaner to control via the application, the AP information may be transmitted to the robot cleaner and authentication for access to the robot cleaner may be performed.

When the access is authenticated, Wi-Fi communication between the robot cleaner and the external terminal is performed and the user may control the robot cleaner via the Wi-Fi communication, using the external terminal.

The AP information may be recorded in the NFC module 198 of the robot cleaner but wiring is not allowed. In other words, the NFC module 198 allows only reading. In this instance, the NFC module may be configured very simply, because signal transmission with the controller 160 can be excluded and because signal transmission with the Wi-Fi module 190 can be excluded. The NFC module 198 may be configured to transmit only the AP information to the external terminal easily.

Meanwhile, an auxiliary controller different from the controller 160 for controlling the driving of the suction device 120 or the driving unit 150 may be provided. The controller 160 for controlling the driving of the suction device 120 or the driving unit 150 may be called a main controller 160. The main controller 160 may control various sensors or a power device. The auxiliary controller may be the controller for generating location information of the robot cleaner and it may be called the vision controller 165 for convenience sake. The main controller 160 and the vision controller 165 may exchange a signal via serial communication.

The vision controller 165 may generate location information based on the image information of the camera 195. Also, the Wi-Fi module 190 may be mounted in the vision controller 165.

Accordingly, the Wi-Fi module 190 may communicate with the vision controller 165 via serial communication.

The Wi-Fi module 190 may include a wireless LAN card. The wireless LAN card may be loaded in the main controller 160 or the vision controller 165. Specifically, the wireless LAN card may be loaded in the vision controller 165 and the Wi-Fi module 190 may enable serial communication with the vision controller 165.

The main controller 160 and the vision controller 165 may compose an additionally provided microcomputer. When diverse calculations are performed, using the main controller 160, a problem of a slow processing speed might be generated.

Signal transmission and reception via the Wi-Fi module 190 may be controlled by the vision controller 165.

The wireless LAN card may be provided as a USB type and the USB type wireless LAN card may be connected to a board having a USB port. Such a board may form the vision controller 165 or the main controller as the case may be. Accordingly, it is very important to keep the coupling between the wireless LAN card and the board. When the wireless LAN card 192 is decoupled from the board, the communication between the robot cleaner and the external terminal is impossible. The coupling structure will be described in detail later.

Meanwhile, the NFC module 198 may be configured only to record information simply and it may be provided only with the required power. As shown in FIG. 4, the NFC module 198 needs not be directly connected to the main controller 160 or the vision controller 165. In other words, the NFC module 198 may exclude communication with the main controller 160, the vision controller 165 and the Wi-Fi module 190. Accordingly, the robot cleaner having the NFC module 198 may be provided easily.

FIG. 4 illustrates one example of the NFC module 198 provided with only the power by the main controller 160 via the camera module 195.

The robot cleaner 100 according to this embodiment may include a second wireless communication unit 180 which is distinguished from the Wi-Fi module 190 and the NFC module 198 mentioned above. The second wireless communication unit 180 may be also provided for short range wireless communication. Accordingly, the second wireless communication may be a short range communication module.

The second wireless communication unit 180 may include a module where short range communication may be performed. Examples of the short range communication include Bluetooth, RFID (Radio Frequency Identification), IrDA (Infrared Data Association), UWB (Ultra Wideband) and ZigBee.

The second wireless communication unit 180 may be provided for short range wireless communication with a recharging base (not shown) of the robot cleaner.

Next, referring to FIGS. 5 through 7, an example of the external terminal 200 for remote controlling the robot cleaner will be described. Hereinafter, it can be said that such the robot cleaner and the external terminal compose a robot cleaner system.

Figure 5:
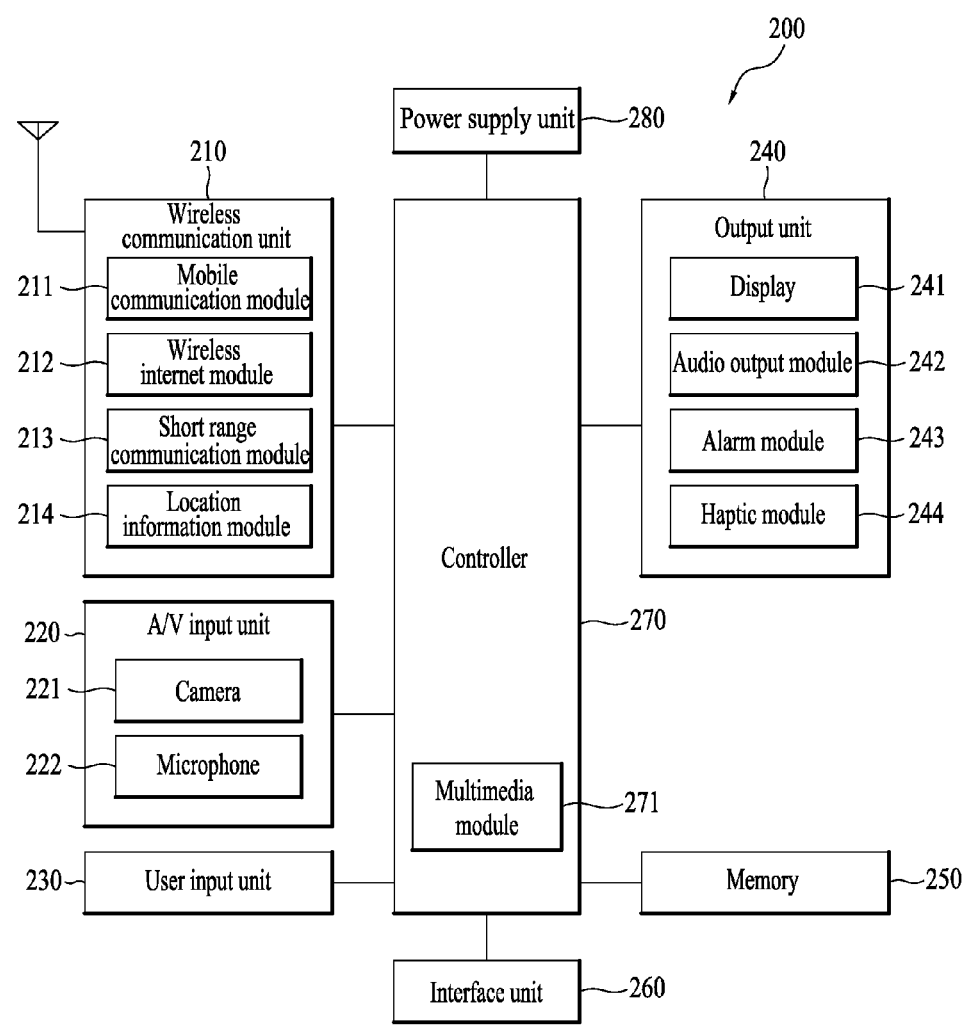
FIG. 5 is a block diagram of a remote control device composing the robot cleaner system according to one embodiment of the disclosure.

FIG. 5 is a block diagram of the external terminal composing the robot cleaner system according to one embodiment of the disclosure.

The external terminal 200 in the present disclosure is a device remote-accessible to the robot cleaner 100 to control the driving of the robot cleaner 100. Examples of the external terminal may include a smart phone, PDA (Personal Digital Assistant) and PMP (Portable Multimedia Player).

For convenient explanation of the disclosure, a smart phone is used as the external terminal 200 of the robot cleaner 100.

The external terminal 200 may include a wireless communication unit 210, AV (Audio/Video) input unit 220, a user input unit 230, an output unit 240, a memory 250, an interface unit 260, a terminal controller 270 and a power supply unit 280. The components shown in FIG. 5 are not necessarily provided and an external terminal 200 having more or less components may be realized.

Each of the components will be described in order.

The wireless communication unit 210 (a second wireless communication unit) may include one or more modules that enables wireless communication between wireless communication systems or wireless communication between the external terminal 200 and a network in which the external terminal 200 is located. For example, the second wireless communication unit 210 may include a mobile communication module 211, a wireless internet module 212 and a short range communication module 213.

The mobile communication module 211 transmits and receives a wireless signal to and from one or more of a base station, an external terminal a server on a mobile communication network. Such a wireless signal may include various types of data in accordance with transmission/receiving of a voice call signal, a video call signal or a texture/multimedia message.

The wireless internet module 212 is a module for wireless internet link and it may be an internal or external element of the external terminal 200. Examples of wireless internet technologies may include WLAN (Wireless LAN) (Wi-Fi), WiBro (Wireless Broadband), WiMax (World Interoperability for Microwave Access) and HSDPA (High Speed Downlink Packet Access). In this instance, the wireless internet module 212 may be a Wi-Fi module and such a Wi-Fi module may access to AP of the robot cleaner mentioned above and enable Wi-Fi communication between the external terminal 200 and the robot cleaner 100.

The short range communication module 213 is a module for short range communication. Examples of short range communication may include Bluetooth, RFID (Radio Frequency Identification), IrDA (Infrared Data Association), UWB (Ultra Wideband), ZigBee or NFC (Near Field Communication). In this instance, the short range communication module 213 may be a NFC module for performing NFC communication with the NFC module of the robot cleaner mentioned above. Accordingly, the user may locate the external terminal 200 near the robot cleaner and receive AP information via NFC communication.

Referring to FIG. 5, the A/V input unit 220 is for inputting an audio signal or a video signal and it may include a camera 221 and a microphone 222. The camera 221 processes image frames of a video file or a still image gained by an image sensor in a video call mode or camera mode. The processed image frame may be displayed on a display 241.

The image frame processed by the camera 221 may be stored in the memory 250 or transmitted to an external device via the second wireless communication unit 210. Two or more cameras 221 may be provided in accordance with a service environment.

The microphone 222 converts an external audio signal received from the outside into electric voice data in a call or record mode and a voice recognition mode. In the call mode, the processed voice data may be converted into a transmittable signal and output to a mobile communication base station by the mobile communication module 211. In the microphone 222 may be realized various types of noise rejection algorisms for reflecting the noise generated while receiving the external audio signal.

The user input unit 230 generates data for the user to control the operation of the external terminal 200. The user input unit 230 may consist of a key pad, a dome switch, a touch pad (static pressure/capacitive type), a jog wheel and a jog switch.

The output unit 240 may generate output associated with visual, auditory or tactual sense. The output unit 240 may include a display 241, an audio output module 242, an alarm unit 243 and a haptic module 244.

The display 241 displays, in other words, outputs the information processed in the external terminal 200. For example, the display 241 may display UI (User Interface) or a GI (Graphic User) interface associated with a call when the external terminal 200 is in a call mode. When the external terminal 200 is a video call mode or a camera mode, the display 241 may display photographing and/or received image or UI and GUI.

The display 241 may include at least one of a liquid crystal display (LCD), a thin film transistor liquid crystal display (TFT LCD), an organic light emitting diode (OLED), a flexible display and a 3D display.

Two or more displays 241 may be provided in accordance with a realizing type of the external terminal 200. For example, a plurality of displays 241 may be arranged in one surface at intervals or integrally, or they may be arranged in different surfaces, respectively.

When the display 241 and a sensor for sensing touch input (hereinafter, 'a touch sensor') form a layer structure (hereinafter, 'a touch screen'), the display 241 may be used as an input device as well as an output device. The touch sensor may have a touch film, a touch sheet and a touch pad.

The touch sensor may be configured to convert a pressure applied to a specific point of the display 241 or change in capacitances generated in a specific point into an electric input signal. The touch sensor may detect a position of input touch and an area of the input touch. Also, it may detect a pressure applied in the touch input.

When the touch input is sensed by the touch sensor, a signal(s) corresponding to the touch may be transmitted to a touch controller. The touch controller processes the signal(s) and transmits data corresponding to the signal(s) to the terminal controller 270. After that, the terminal controller 270 may the terminal controller 270 may determine which point is touched on the display 241.

The audio output unit 242 may output audio data received from the second wireless communication unit 210 or stored in the memory 250 in call signal receiving, a call or record mode, a voice recognizing mode and a broadcasting receive mode. The audio output unit 242 may output an audio signal associated with functions performed by the external terminal 200 (e.g., a call signal receiving sound and a message receiving sound). Such the audio output unit 242 may include a receiver, a speaker and a buzzer.

The alarm unit 243 outputs signal for notifying event generation of the external terminal 200. Examples of the event generated in the external terminal 200 may include call signal receiving, message receiving, key signal input and touch input. The alarm unit 243 may also output another type signal rather than the video or audio signal. The alarm unit 243 may output a vibration signal for notifying the event generation. The video or audio signal may be output even via the display 241 or the audio output module 242 and both of the display 241 and the audio output module 242 may be categorized as the alarm unit 243.

The haptic module 244 generates various tactile or haptic effects sensed by the user. A typical example of the haptic effects generated by the haptic module 244 may be vibration. Intensity and a pattern of the vibration generated by the haptic module 244 may be controllable. For example, different vibrations may be compounded and output or they may be sequentially output.

The memory 250 may store a program for operating the terminal controller 270 or temporarily store input/output data (e.g., a phone book, a message, a still image and a motion picture) therein. The memory 250 may store various patterned vibrations and sounds output after the touch input.

The memory 250 may include at least one of storage medium including a flash memory type, a hard disk type, a multimedia card micro type, a card type memory (e.g., a SD or XD memory), RAM (Random Access Memory), SRAM (static Random Access Memory), PROM (Programmable Read-Only Memory), MRAM (Magnetic Random Access Memory), a magnetic disk and an optical disk. The external terminal 200 may be operated in association with a web storage performing a storage function of the memory 250 on an internet The interface unit 260 may be employed as a passage to all of the external devices connected with the external terminal 200. The interface 260 may be provided with data or the power by the external devices and transmit the data or power to each of the elements or transmit data of the external terminal 200 to the external device. for example, the interface unit 260 may include a wire/wireless headset port, an external charger port, a wire/wireless data port, a memory card port, a port for connecting a device having an identify module, an audio I/O (Input/output) port, a video I/O port and an earphone port.

The identify module is a chip storing a variety of information therein to identify an authority for use of the external terminal 200. The identification module may include SIM (Subscriber Identify Module) and USIM (Universal Subscriber Identity Module). A device having the identify module (hereinafter, "identify device") may be fabricated to be a smart card. Accordingly, the identify device may be connected to the external terminal 200 via a port.

The terminal controller 270 typically controls an overall operation of the remote control device. For example, the terminal controller 270 performs control and process associated with voice call, data communication and video call. The terminal controller 270 may include a multimedia module 271 for playing multimedia. The multimedia module 271 may be realized in the terminal controller 270 or separately realized.

The terminal controller 270 may process pattern recognition for recognizing handwriting input or drawing input performed on a touch screen as characters and images.

The power supply unit 280 may be provided with an external power or internal power in accordance with the control of the controller 270 and supply a power required by the operation of the components.

The embodiment of the present disclosure may be realized in a computer or readable media similar to the computer, using software, a hardware or combination of the software and the hardware.

In hardware realization, the embodiments described herewith may be realized by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro-controllers, microprocessors and electric units for performing other functions. In some cases, the embodiments may be realized by the terminal controller 270.

In software realization, embodiments such as processes and functions may be realized together with an auxiliary software module performing one or more functions or operations. A software code may be realized by a software application written in a proper program language. The software code may be stored in the memory 250 and performed by the terminal controller 270. The application may include a specific application for controlling the robot cleaner 100 mentioned above.

Figure 6:
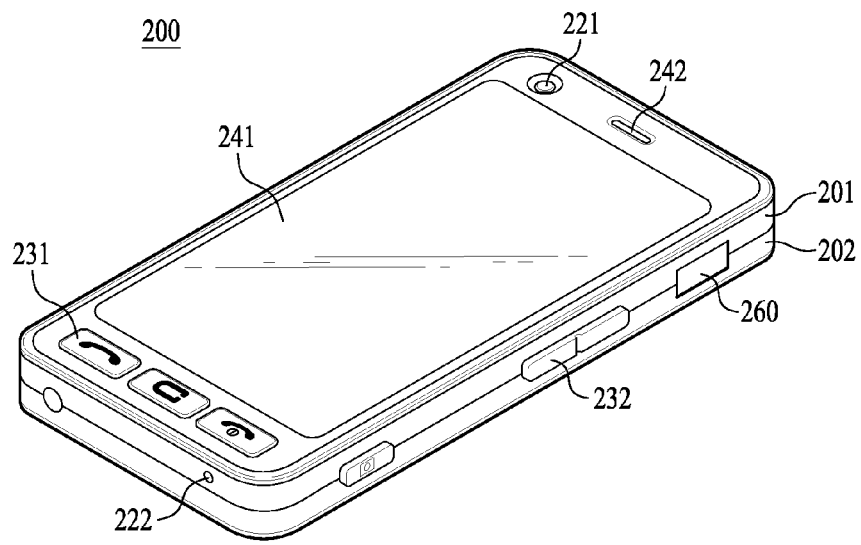
FIG. 6 is a front perspective diagram of the remote control device composing the robot cleaner system according to one embodiment of the disclosure, seen in front.

FIG. 6 is a front perspective diagram of the remote control device composing the robot cleaner system according to one embodiment of the disclosure, seen in front.

The external terminal 200 described above includes a bar-shaped body and the embodiments are not limited thereto. The remote control device may be a slide type, a folder type, a swing type and a swivel type, with two or more bodies relative-movably coupled to each other.

The body includes a case (e.g., a casing, a housing and a cover) for defining an exterior appearance of the external terminal 200. In this embodiment, the case may be divided into a front case 201 and a rear case 202. Various electronic components are mounted in a space formed between the front case 201 and the rear case 202. One or more intermediate cases may be additionally arranged between the front case 201 and the rear case 202.

The cases may be injection-molded of synthetic resin or they may be formed of a metallic material (e.g., stainless steel (STS) and titanium (Ti)).

In the body of the external terminal 200, mainly, in the front case 201 may be arranged the display 241, the audio output unit 242, the camera 221, the input units 230/231 and 232, the microphone 222 and the interface 160.

The display 241 occupies most of a main surface possessed by the front case 201. The audio output unit 242 and the camera 221 may be arranged adjacent to one of ends of the display 241. The input unit 231 and the microphone 222 may be arranged adjacent to the other end. The input unit 232 and the interface 160 may be arranged in lateral surfaces of the front and rear cases 201 and 202.

The user input unit 230 may be operated by the user to receive an input command for controlling the operation of the external terminal 200. The user input unit 230 may include a plurality of manipulating units 231 and 232. The manipulating units 231 and 232 may be called as a manipulating portion. Any tactile manners in which the user manipulates, with a tactile sense may be applied.

The contents input by the first or second manipulating units 231 and 232 may be set in various manners. For example, the first manipulating unit 231 receives an input command (e.g., a start command, an end command and a scroll command). The second manipulating unit 232 may receive an input command (e.g., controlling of a sound output from the audio output unit 242 and conversion into a touch recognition mode of the display 241).

Figure 7:
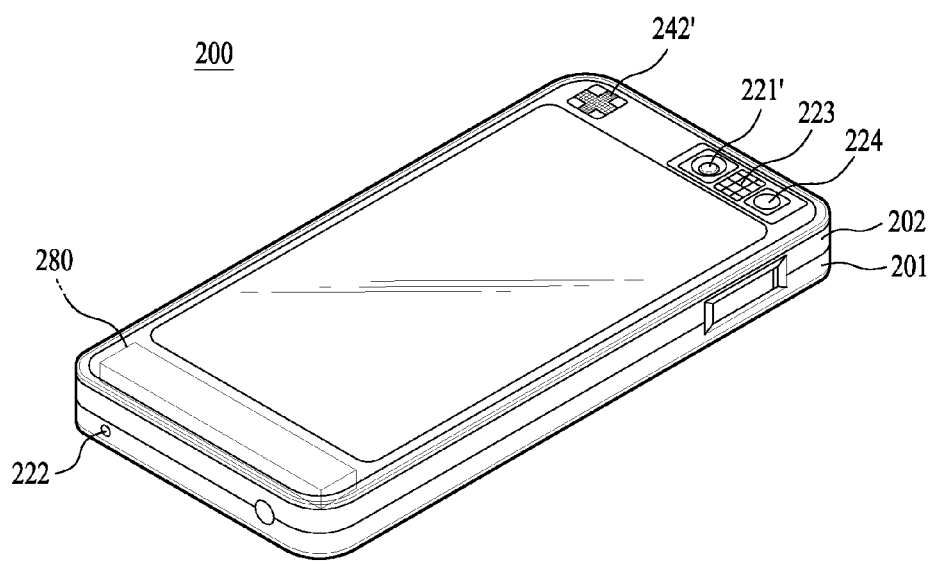
FIG. 7 is a rear perspective diagram of the remote control device composing the robot cleaner according to one embodiment of the disclosure.

FIG. 7 is a rear perspective diagram of the remote control device composing the robot cleaner according to one embodiment of the disclosure.

Referring to FIG. 7, a camera 221' may be additionally mounted in a rear surface of the body possessed by the external terminal 200, in other words, in the rear case 202. The camera 221' may have a photographing direction substantially opposite to a photographing direction of the camera (221, see FIG. 6) and it may have pixels different from the pixels of the camera 221.

For example, the camera 221 may have low pixels which cause no problems in transmitting a photograph of the user's face to the other opponent on a video call. The camera 221' may have high pixels because it is often not to transmit a conventional object immediately after photographing. The camera 221' may be coupled to the body of the external terminal 200 with rotatable or being able to pop up.

A flash 123 and a mirror 124 may be additionally arranged adjacent to the camera 221'. The flash 123 flashes a light upon an object when the camera 221' photographs an object. The user may reflect the face in the mirror 124 when trying to photograph himself or herself (in other words, self-photograph).

An audio output unit 242' may be additionally arranged in a rear surface of the body possessed by the external terminal 200. The audio output unit 242' may realize a stereo function, together with the audio output unit (242, see FIG. 6). The audio output unit 242' may be used in realizing a speaker phone during the call.

A power supply unit 280 may be mounted to the body of the external terminal 200 to supply a power to the external terminal 200. The power supply unit 280 may be mounted in the body of the external terminal 200 or directly and detachably coupled to an outer surface of the body possessed by the external terminal 200.

Figure 8:
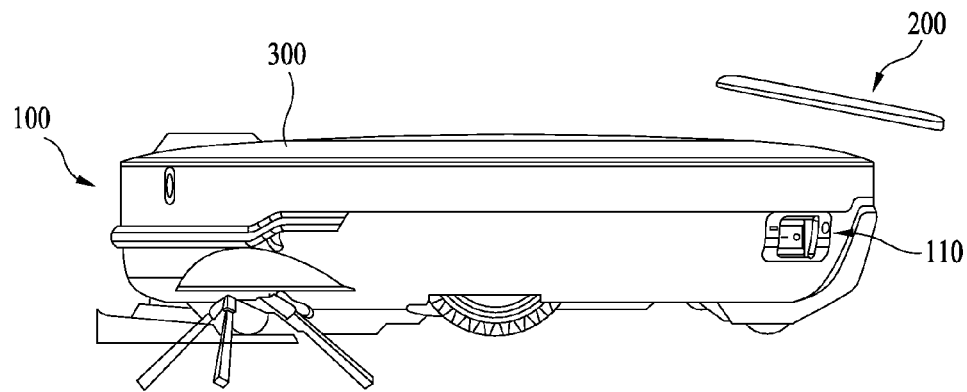
FIG. 8 is a side view illustrating NFC communication between an external terminal and the robot cleaner according to one embodiment of the disclosure.

Hereinafter, referring to FIG. 8, a robot cleaner system according to one embodiment of the present disclosure will be described.

As shown in the drawing, the robot cleaner system may include a robot cleaner 100 and an external terminal 200.

The robot cleaner 100 and the external terminal 200 may be equal to or similar to the robot cleaner and the external terminal 200 mentioned above.

First of all, the external terminal 200 may be located in a specific position over the robot cleaner 100. Not even in contact, the external terminal 200 is located in a preset range of distances. The AP information of the robot cleaner 100 may be transmitted to the external terminal 200 via the NFC module of the robot cleaner 100 easily. In other words, even if not recognizing or memorizing the AP information, the user may locate the external device 200 near the robot cleaner 100 and the AP information may be transmitted to the external terminal 200.

It is preferred that a specific position of the robot cleaner 100 is the position where the NFC module of the robot cleaner 100 is mounted. Especially, the specific position may be an upper surface of the robot cleaner 100, for the user to locate the external terminal 100 in the specific position easily. Accordingly, a NFC tag antenna of the NFC module may be located toward an upper surface of the robot cleaner.

Hereinafter, referring to FIG. 9, the mounting structure of the NFC module 198 and the Wi-Fi module 190 in the robot cleaner 100 will be described in detail.

Figure 9:
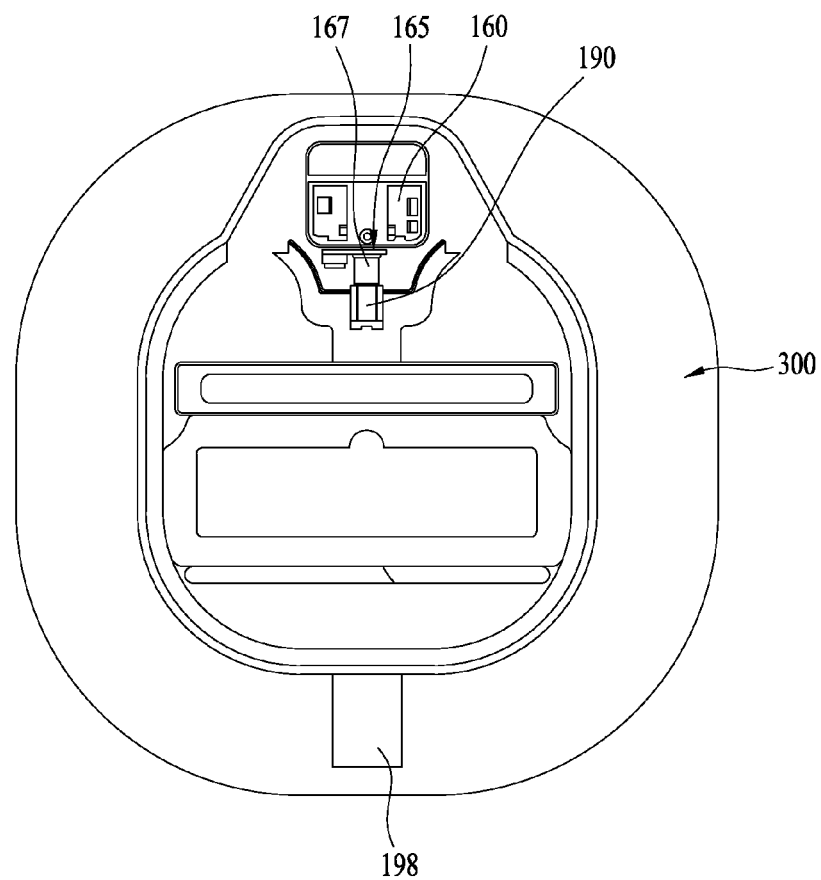
FIG. 9 is a plane view illustrating a rear surface of an upper cover provided in the robot cleaner.

In FIG. 9, a rear surface of the upper cover 300 provided in the robot cleaner is shown. The upper cover 300 may form the upper surface of the robot cleaner 100. Accordingly, the structure of the upper cover 300 may be the structure in which the user can approach most easily and which forms the outer surface of the robot cleaner, especially, an upper surface of the robot cleaner.

The NFC module may be formed of a board and a NFC Tag antenna may be formed in the NFC module. The antenna may be mounted in the rear surface of the upper cover 300 to face the upper surface of the robot cleaner 100. The NFC module 198 may be mounted through a hook 199 formed in the upper cover 300.

The upper cover 300 may be formed of a plastic molding and it is not so thick. Accordingly, a distance between the NFC module 198 and an outer surface of the upper cover 300 is not so far. For example, the distance may be within 10 mm. In other words, the NFC module 198 may be located in the outer surface of the upper cover 100 deep within 10 mm.

Even without a metallic material disposed between the NFC module 198 and the upper cover, a quite short distance may be kept. That means that the communication between the external terminal and the NFC module 198 may be performed very easily. Only when the external device is located only to a position having a preset distance near the upper cover, the NFC communication may be performed. Accordingly, damage to the upper cover or the surface of the external terminal caused by the contact may be prevented.

Meanwhile, the upper cover may have a central portion convex upward. Accordingly, both ends of the upper cover 300 have a height different from a height of the NFC module. Such a height difference may form a distance between the NFC module and the components of the robot cleaner located under the NFC module.

Accordingly, a front surface of the NFC module 198 may be as close as possible to an outer surface of the robot cleaner and a distance between the rear surface and the other components of the robot cleaner may be secured. That means noise causing elements of the NFC communication can be reduced remarkably. That is because the metallic material near the NFC module, especially, the antenna may have a bad influence on the NFC communication.

Hereinafter, referring to FIG. 9, the mounting structure of the Wi-Fi module 190 will be described in detail.

As shown in the drawing, a wireless LAN card 190 may be realized as the Wi-Fi module 190 and a required board may be vision controller 165. Accordingly, the LAN card 190 may be mounted in the vision controller 165.

A distance between the wireless LAN card 190 and the main controller 160 may be 100 mm or less to reduce communication noise. The wireless LAN card 190 may be mounted in the rear surface of the upper cover 300 like the NFC module 198 mentioned above.

Specifically, a user UI may be provided in front of or behind the upper cover 300. Accordingly, the main controller 160 may be in front of or behind the upper cover 300. The NFC module 198 may be mounted behind or in front of the upper cover 300 which is the opposite position of the wireless LAN card 190.

The wireless LAN card 190 may be a USB dongle type such that the wireless LAN card 190 may be insertedly coupled to a USB port 167 formed in the board. Such a structure may prevent the wireless LAN card 190 from being decoupled from the board.

Meanwhile, the board composing the vision controller 165 may be also secured to the upper cover 300 stably, as well as the board composing the wireless LAN card 190. The vision controller 165 may be coupled to the main controller 160 in a direction where the vision controller 165 is coupled.

The coupling direction between the USB type wireless LAN card and the UBS port may be realized as substantially horizontal. That means that a longitudinal direction of the wireless LAN card is a horizontal direction. Accordingly, the height of the robot cleaner may be prevented from increasing. The coupling between the wireless LAN card and the board and the fixing structure of the two elements to the upper cover can be performed easily.

Hereinafter, a control method of the robot cleaner through the external terminal will be described.

The robot cleaner has to communicate the external terminal to be controlled through the external terminal by the user. The robot cleaner may provide a self AP function. The external terminal has to have the AP information to access to the AP.

Accordingly, to transmit the AP information to the external terminal easily, the robot cleaner may transmit the AP information of the Wi-Fi module embedded in the case to the external device through the NFC module.

The external terminal transmits the AP information to the robot cleaner and the robot cleaner may authenticate the external terminal based on the AP information received from the external terminal. In other words, the external terminal connects to the AP.

When the access and the authentication are performed, the robot cleaner may Wi-Fi communicate with the external terminal. In other words, the both may Wi-Fi communicate with each other via the AP provided by the robot cleaner itself. Remote control of the robot cleaner may be performed on the external terminal via such the Wi-Fi communication.

The control of the robot cleaner through the steps means that the user can directly control the robot cleaner nearby, in other words, in an area where Wi-Fi communication can be performed via the AP of the robot cleaner. For example, the control of the robot cleaner may be performed in the area recognized by the user.

Accordingly, the other person is prevented from controlling the robot cleaner discretionarily. Also, even if the other person controls the robot cleaner discretionarily, the user can find the other person's control easily.

Meanwhile, the AP information of the robot cleaner may be transmitted to the external terminal only when the user approaches the external terminal near the robot cleaner. In other words, the transmission of the AP information from the robot cleaner to the external terminal may be performed in the range of the areas recognized by the user. In many cases except the case of the other person's trespassing on the house, the user may receive the information and the information may be transmitted at least under the user's eyes.

The robot cleaner may be controlled in the range of the areas recognized by the user and the user may control the robot cleaner easily at the same time. In other words, only when the external terminal is located near the robot cleaner very simply, the robot cleaner and the external terminal can communicate with each other. Specifically, troublesome and complex manual AP input may be excluded.

In this instance, the control of the robot cleaner through the external terminal may include remote controlling and/or monitoring via state information of the robot cleaner. Such the control may be performed via the Wi-Fi communication mentioned above.

Hereinafter, a control method of the robot cleaner system including the external terminal and the robot cleaner will be described.

First of all, to control the robot cleaner through the external terminal, the information on the robot cleaner has to be stored in the external terminal. That is because a specific robot cleaner is controlled through the external terminal, in other words, a control object has to be specified.

The specification of the control object may be performed based on the robot cleaner information and such the robot cleaner information may include AP information. That may be the information on the self AP provided by the robot cleaner. Such the AP information is specific information and the robot cleaner as the control object may be specified.

A step of storing the robot cleaner information stored in the external terminal may be performed through the communication between the NFC module of the external terminal and the NFC module of the robot cleaner having the recorded robot cleaner information which includes information of the Wi-Fi module embedded in the case of the robot cleaner.

The robot cleaner information may include a plurality of pieces, because a plurality of robot cleaners can be provided in a house rarely. The user may select information on a specific robot cleaner or a menu displaying the information of the specific robot cleaner, to specify a robot cleaner as a control object. In other words, a step of selecting a robot cleaner as a remote control object based on the received information of the robot cleaner may be performed.

When the user selects a robot cleaner as a control object through the external terminal, the external terminal transmits AP information to the robot cleaner. In other words, the external terminal tries to access to the robot cleaner. The robot cleaner authenticates the external terminal based on the received AP information to allow Wi-Fi communication with the external terminal.

After the access and the authentication, the Wi-Fi modules of the two may perform the Wi-Fi communication. The control of the robot cleaner may be performed by the user via the Wi-Fi communication, using the external terminal.

Accordingly, in the embodiment of the present disclosure may be provided the robot cleaner and the robot cleaner system, which includes the NFC module performing relatively short range communication for instant communication and the Wi-Fi module for performing relatively remote range communication for continuous communication in controlling.

Also there may be provided the robot cleaner and the robot cleaner system, which may perform independent positions and coupling as well as independent controlling and signal processing. Accordingly, the robot cleaner and the robot cleaner system including such the modules maybe provided easily. The communication or signal processing between the two modules may not be required such that a control logic structure cannot be complex.

Hereinafter, a robot cleaner, a robot cleaner system and a control method thereof according to one embodiment, of which a history on the cleaning performed by the robot cleaner may be recognized by a user easily will be described in detail.

In the embodiment, the user may recognize a cleaning history information of the robot cleaner easily. The cleaning history information may be displayed on the external terminal through wireless communication between the external terminal and the robot cleaner. Such wireless communication may be equal to or similar to the wireless communication mentioned in the above embodiment. Also, the robot cleaner and the external terminal applied to this embodiment may be equal or similar to those applied to the embodiment mentioned above.

Figure 16:
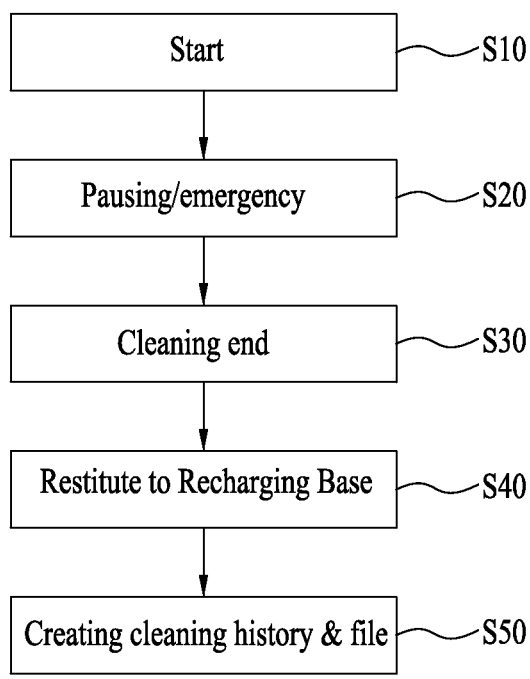
FIG. 16 is a flow chart illustrating cleaning processes of the robot cleaner.

Referring to FIG. 16, the cleaning history information generated in the robot cleaner will be described in detail.

The robot cleaner 100 starts cleaning while automatically driving a cleaning area in accordance with an embedded algorithm or a reversed cleaning time set by the user (S10). Cleaning methods of the robot cleaner may be diverse. Examples of the cleaning methods include a zigzag mode for cleaning in zigzag and a meticulous mode for repeatedly cleaning a cleaning area.

When it starts cleaning, the robot cleaner 100 records cleaning history information while performing the cleaning in a preset cleaning mode. The robot cleaner 100 starts the cleaning periodically and ends the cleaning. For example, the robot cleaner may perform cleaning several times a day. Accordingly, the cleaning history information may include bibliographical information for distinguish a series of cleanings from the start to the end from other cleanings.

The bibliographical information may include a cleaning date, a cleaning start time and a cleaning end time. Also, the bibliographical information may include cleaning modes. Of course, the bibliographic information may include checking whether the cleaning is performed based on a preset algorithm or based on the user's reservation setting.

When the robot cleaner 100 starts cleaning, the cleaning history information starts to be recorded.

At this time, the cleaning history information may include map information on a cleaning area where the robot cleaner performs the cleaning and moving path information.

The map information may be divided into information on an area where the robot cleaner can clean, an area where the robot cleaner cannot clean and an obstacle area. The moving path information may be information on the moving path of the robot cleaner performing the cleaning.

The map information may be modified whenever the cleaning starts. Of course, the initially created map information may be modified whenever a new cleaning is performed. Accordingly, individual map information may be generated for one cleaning and moving path information corresponding to the individual map information may be generated.

Before the cleaning is completed after starting, the user may request pausing or an emergency situation may be generated. The pausing is generated when the user inputs to the robot cleaning to pause the cleaning. The emergency situation is generated when the robot cleaner is blocked by an obstacle not to escape from the obstacle temporarily.

Even in such the pausing or the emergency situation, the robot cleaner may continue the recording of the cleaning history information.

Meanwhile, in case the user inputs a new cleaning mode while the cleaning is performed, the recording of the cleaning history information may be stopped. Even in case the user inputs a command for restituting the robot cleaner to a recharging base while the robot cleaner is performing the cleaning, the recording of the cleaning history information may be stopped. In other words, the former cleaning history information is deleted and new cleaning history information is recorded. Even when recognizing that re-cleaning is impossible because the robot cleaner fails to overcome the emergency situation, the recording of the cleaning history information may be stopped.

The stopping of the cleaning history information recording may be performed in case the cleaning is not ended normally. When the cleaning is not ended normally, it can be said that the cleaning is not performed effectively and completely. Accordingly, in case of showing the user the recording, the user could question the reliability of the robot cleaner.

For example, when the user enters the house while the robot cleaner performs cleaning, the cleaning can be ended forcedly. When the cleaning history about the incomplete end of the cleaning remains, the user may forget the reason for the incomplete ending of the cleaning. While forgetting such the reason, the user might see the recording of the incomplete ending of the cleaning and question the reliability of the robot cleaner. Accordingly, in case of abnormal ending of cleaning, the recording of the cleaning history information is stopped and not stored.

To enhance user satisfaction, the recording of the cleaning history information may be continued in case of the pausing or the solvable emergency situation as mentioned above.

The cleaning starts (S10) and the robot cleaner itself determines whether the cleaning is completed to end the cleaning (S30). Once the cleaning is ended, the robot cleaner restitutes to the recharging base (S40).

In this instance, the robot cleaner may restitute to the recharging base not only in case of the cleaning completion but also in case of charging the battery. In these cases, the recording of the cleaning history information from the restitution to the recharging base, the charging of the battery and the re-starting of the cleaning may be continued.

Once the robot cleaner restitutes to the recharging base (S40) after the completion of the cleaning, the robot cleaner 100 generates a cleaning history file and stores the cleaning history file (S50). The cleaning history file includes cleaning history information from the start of the cleaning to the normal ending of the cleaning.

The user may input ending of cleaning while the robot cleaner is restituting to the recharging base after the cleaning is completed. Even in this instance, it may be determined that the cleaning is normally ended.

The cleaning history information recorded as the cleaning starts may be created and stored as a file only when it performs the storing step. Specifically, unless the cleaning reaches the storing step, in other words, when the cleaning is ended abnormally, the cleaning history information is deleted, not stored as the file.

The user may figure out the cleaning history through the cleaning history information file. In case of the abnormal ending of the cleaning having no generated cleaning history information file, the user cannot figure out the cleaning history. As mentioned above, that is for giving the reliability and preventing the user's confusion.

Meanwhile, the cleaning history information may be generated in an individual list. For example, the bibliographic information is created as an individual list. Using such the individual list, a specific cleaning may be distinguished from other cleanings.

For example, a cleaning start time and a cleaning end time may be figured out based on the individual list such that the specific cleaning can be distinguished from other cleanings based on the individual list.

Accordingly, the individual list may be made and stored when the cleaning is ended normally as mentioned above. A plurality of individual lists may be made and stored because of characteristics of the individual list. A preset number of individual lists may be stored. The oldest individual list may be replaced by the latest one and the latest individual list may be stored.

As mentioned above, such the individual list may not be generated in case of the abnormal ending of the cleaning.

In the step of making the cleaning history file (S50), the individual list is made and stored and also the recorded cleaning history information may be stored. For example, the file in which the map information on the cleaning area and the moving path information may be stored.

The file corresponding to the map information and the file corresponding to the moving path may be generated independently and stored. Such the map file and the moving path file may be generated for each of the individual lists. In other words, the map file and the moving path file corresponding to a specific cleaning may be mapped.

Such the individual list, the map file and the moving path file may be mapped with each other. However, they are individual files, respectively. The transmission of the individual list is separated from the transmission of the map file and the moving path file.

For that, the external terminal may separately request such the information. For example, the robot cleaner may transmit the individual list to the external terminal based on the request of the individual list information made by the external terminal. The external terminal may ask a map file and a moving path file corresponding to the received individual list, such that the robot cleaner may transmit the map file and the moving path file corresponding to the requested individual list to the external terminal.

Accordingly, communication loads may be reduced and the time taken for the user to receive the file needs not be allowed. The user may not need the map file and the moving path file uniformly, which will be described later.

Hereinafter, a control method of the robot cleaner of which a cleaning history may be figured out by the external terminal will be described in detail.

First of all, communication has to be performed between the robot cleaner and the external terminal for the external terminal to figure out the cleaning history. Such communication may be wireless communication. As mentioned in the embodiments, the communication may be wireless communication using the Wi-Fi module. Processes of access and authentication enabling such the communication may be equal to the processes mentioned above in the embodiment.

For example, AP information of the Wi-Fi module embedded in the case of the robot cleaner may be transmitted to the external terminal via a NFC module. The external terminal may register the robot cleaner therein based on the received AP information. After that, the external terminal may transmit the AP information to the robot cleaner, to access to the robot cleaner. In other words, the robot cleaner authenticates the external terminal and such access allows Wi-Fi communication between the robot cleaner and the external terminal.

The communication step may include steps for checking the cleaning history information through the external terminal. First of all, the robot cleaner receives a request for the cleaning history information from the external terminal. Corresponding to the request, the robot cleaner transmits the cleaning history information including the map information on the cleaning area and the moving path information of the robot cleaner to the external terminal. Accordingly, the external terminal displays the cleaning history information to provide the user with the cleaning history information effectively and easily.

Hereinafter, a control method of the robot cleaner system of which a cleaning history may be figured out by the external terminal easily will be described in detail.

A step of wirelessly connecting the external terminal with the robot cleaner may be performed first. Such wireless connection may be performed in various methods and one of examples is mentioned above.

The external terminal asks the robot cleaner for the cleaning history information. The robot cleaner transmit the cleaning history information including the map information on the cleaning area and the moving path information of the robot cleaner to the external terminal. After that, the external terminal displays the map based on the received cleaning history information and performs a step of realizing the moving path of the robot cleaner on the map visually and sequentially.

The area cleaned by the robot cleaner and the moving path of the robot cleaner may be realized on the external terminal visually as the time passed.

Hereinafter, referring to FIGS. 10 through 15, a method for providing the cleaning history information to the user through the robot cleaner or the robot cleaner system mentioned above will be described in detail.

First of all, an application for controlling the robot cleaner is executed in the external terminal 200. When the user selects a robot cleaner to control such an application, a screen shown in FIG. 10 may be displayed on a screen 400 of the external terminal.

Figure 10:
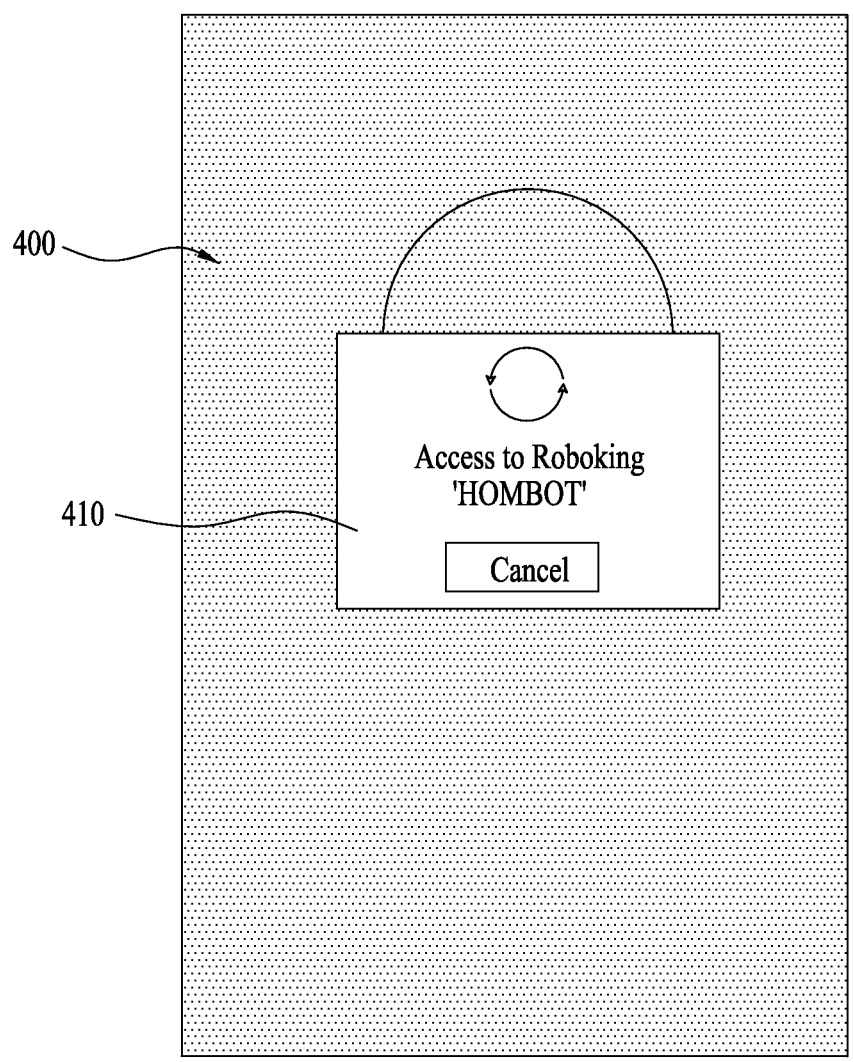
FIG. 10 is one example of a screen displaying access to the robot cleaner from an external terminal.

FIG. 10 is a screen for selecting the robot cleaner after the robot cleaner is registered in the external terminal 200. A screen 410 displaying an attempt for connection is shown.

The registration, access and authentication of the robot cleaner for the external terminal may be equal or similar to those of the embodiments mentioned above.

Figure 11:
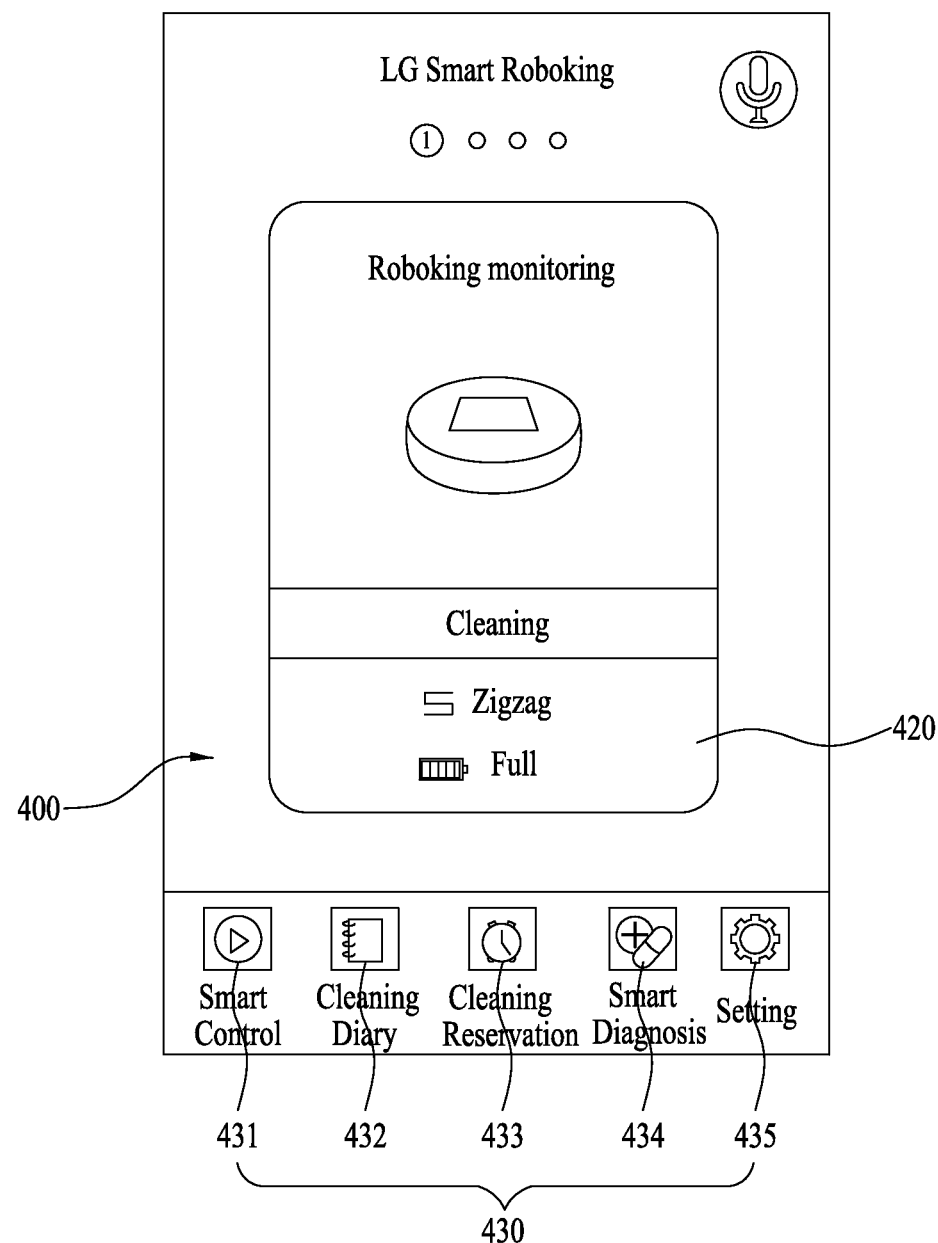
FIG. 11 is one example of an initial screen of an external terminal after completion of access to the robot cleaner.

When the external terminal 200 connects to the robot cleaner 100 via wireless communication, the screen of the external terminal 200 may be converted into a screen shown in FIG. 11.

In the connecting step, a current state of the robot cleaner 100 may be transmitted to the external terminal 200. Such a current state may be displayed on the external terminal 200. As shown in FIG. 11, state information may be displayed on an initial screen of the external terminal 200. The state information may include information on whether the robot cleaner is performing the cleaning currently, a battery charging capacity and a cleaning mode. Such the state information may be displayed on a widget screen 420.

On the initial screen may be displayed the information on the connected robot cleaner and a selection menu 430 for implementing diverse contents may be displayed.

When selecting a smart control menu 431, the user may control the robot cleaner remote. Specifically, a screen for the user to control the robot cleaner by selecting the menu 431 may be displayed.

The user may select a cleaning diary menu 432 and figure out cleaning history information. The user may select a cleaning reservation menu 433 and reserve cleaning wirelessly. The user may select a smart diagnosis menu 435 and diagnose presence of an error in the robot cleaner. The user may select a setting menu 435 and set a function for an application.

Meanwhile, the user's selection of the cleaning diary menu 432 may means asking the robot cleaner for the cleaning history information from the external terminal. When it recognizes the selection of the menu 432, the external terminal asks the robot cleaner for the cleaning history information.

The cleaning history information may include the individual list, the map file and the moving path file mentioned above. However, considering the file capacity and the receiving time, it is preferred that only the individual list is requested when the diary menu 432 is selected. In other words, the robot cleaner may transmit only the information corresponding to the individual list to the external terminal after recognizing the selection of the menu 432.

Figure 12:
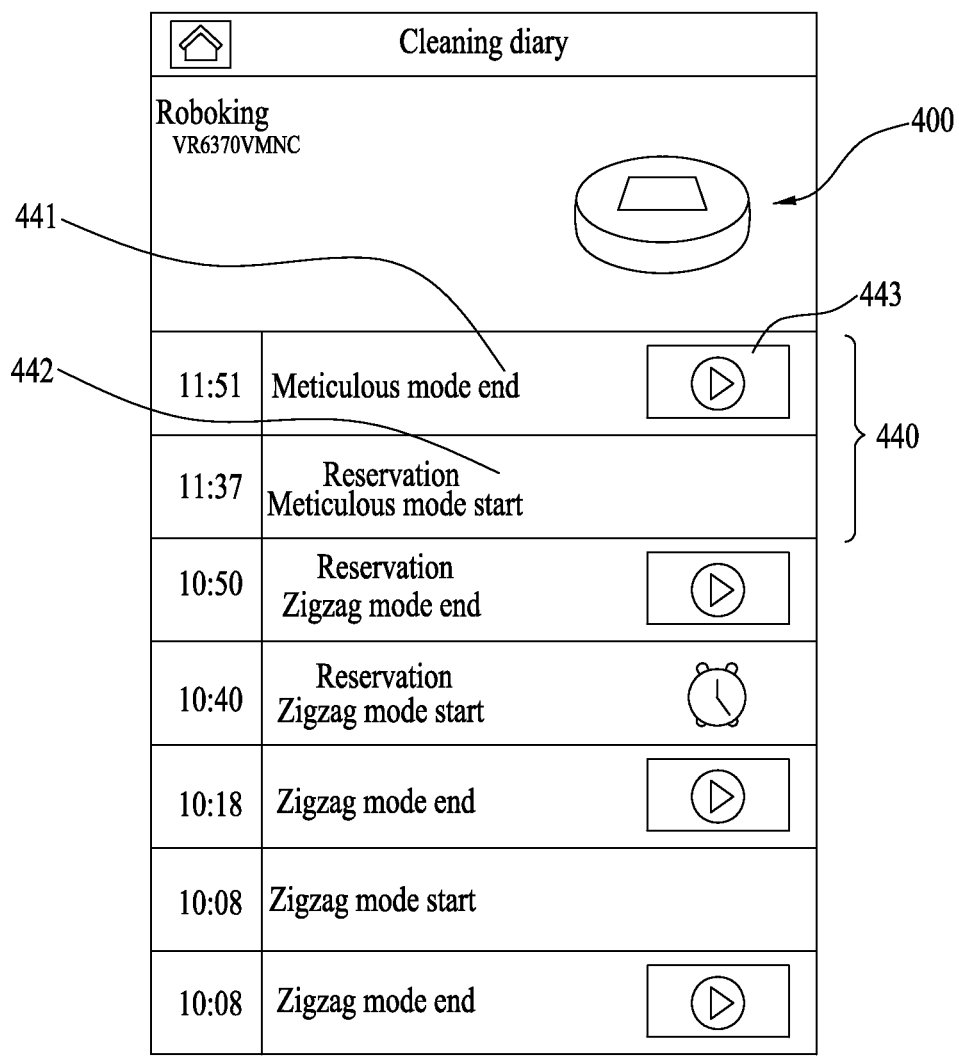
FIG. 12 is one example of a screen converted after a cleaner diary menu shown in FIG. 11 is selected.

When the user selects the cleaning diary menu 432, the external terminal switches a current screen into a screen shown in FIG. 12.

A plurality of lists may be displayed on the screen. Specifically, a series of cleaning lists from the start of the cleaning to the ending of the cleaning in chronological order may be displayed distinguishably.

For example, a cleaning end time information mark 441 and a cleaning end time information mark 442 may be displayed as individual lists. Together with the cleaning end time information mark 441, an auxiliary menu 443 may be displayed. When the user selects the menu 443, the map of performed cleaning and the moving path of the robot cleaner on the map are played as a video file.

Meanwhile, the cleaning lists may display information on cleaning mode information and presence of reserved cleaning. In other words, the external terminal may parse the individual list information received from the robot cleaner and displayed the parsed information sequentially.

The screen shown in FIG. 12 may be shown before receiving the map file and the moving path file from the robot cleaner. In case of the former cleaning list, the corresponding map file and moving path file may be already received. However, in case of the latest cleaning history and the first application executed after ending of the cleaning, a map file and a moving path file corresponding to the latest cleaning history may be not received yet from the external terminal.

The map file and the moving path file may have a large capacity and the user may not always check the files.

Accordingly, an auxiliary menu displayed on the display of the external terminal to ask the map file and the moving path file. The menu may be a cleaning play menu 443 shown in FIG. 12. The play menu 43 may be displayed in relation with a corresponding list mark such that the user may figure out a relation between the bibliographical information and a play menu for playing easily.

Figure 13:
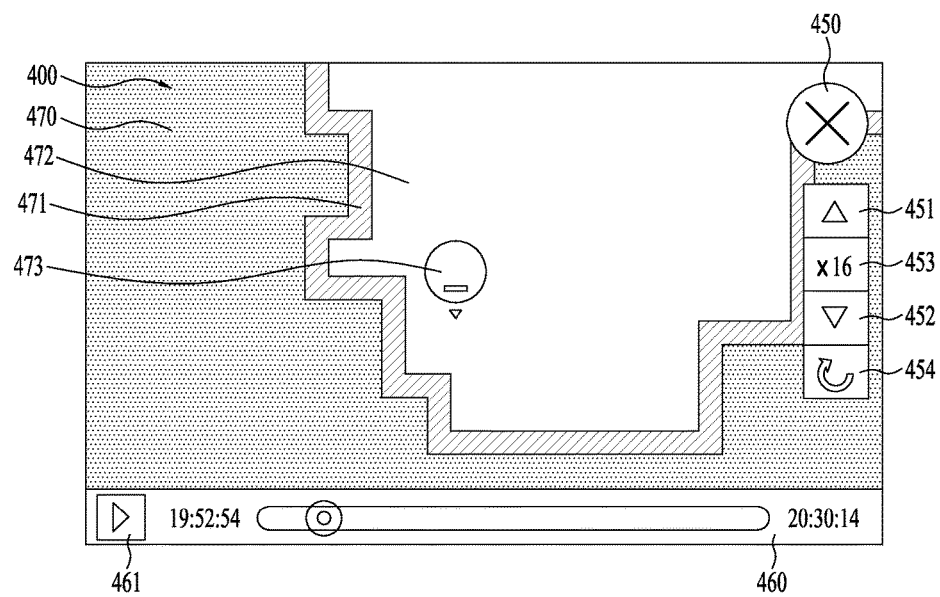
FIG. 13 is one example of a screen for playing a map of the cleaning performed by the robot cleaner and a moving path of the robot cleaner.

When the user selects the cleaning play menu 443, the map of the cleaning performed by the robot cleaner and the moving path of the robot cleaner during the cleaning may be displayed visually and sequentially. Such the screen is shown in FIG. 13.

When the cleaning play menu 443 is selected, the external terminal asks the robot cleaner for the map file and the moving path file. After that, the external terminal parses the information files and converts the current screen into a video file playing screen shown in FIG. 13.

The external terminal displays the map visually based on the map file and the moving path file and realize the moving of the robot cleaner on the map as a video file.

For example, a video file start time (a cleaning start time), a video file end time (a cleaning end time) and a scroll bar 460 for playing the video file may be displayed in a lower portion of the screen 400. A play start menu 461 may be displayed as well.

The displayed map may be distinguished into a cleaning impossible area 470, a wall or obstacle recognized area 471 and a cleaning area 473 visually. The cleaning area 473 may be marked distinguishably from a portion before the robot cleaner passes and a portion after the robot cleaner passes. Accordingly, the user can figure out that the robot cleaner completes the cleaning over the whole cleaning area effectively.

As mentioned above, the moving path of the robot cleaner on the map is played as a video file. A mark 473 corresponding to the robot cleaner is displayed on the map and a forward direction of the robot cleaner may be also displayed, such that the moving path of the robot cleaner and the moving type may be played visually in chronological order.

On the screen 400 may be displayed a converting menu 450 for converting the screen into the former screen and menus 451 and 452 for changing a playing speed of the video file. The user may adjust the playing speed diversely via such menus. For example, the playing speed may be changed into 2×, 4×, 8× and 16× speed.

For example, when the cleaning video file is played at a speed of 16× in case the cleaning takes 16 minutes, the moving path of the robot cleaner may be played as a 16 minute video file from the start to the end of the cleaning.

A rotation menu 454 for rotating the map screen may be displayed. Whenever the user presses the menu 454, the map screen may be rotated 90 degrees in a clockwise direction.

Meanwhile, the map screen may be enlarged or lessened. Also, the displayed map may be moved. Such enlarging and lessening may be realized in diverse methods. For example, the user's two fingers touch the screen and then gather or widen the fingers, to enlarge or lessen the screen. One finger touches the screen and move, to move the displayed map.

Figure 14:
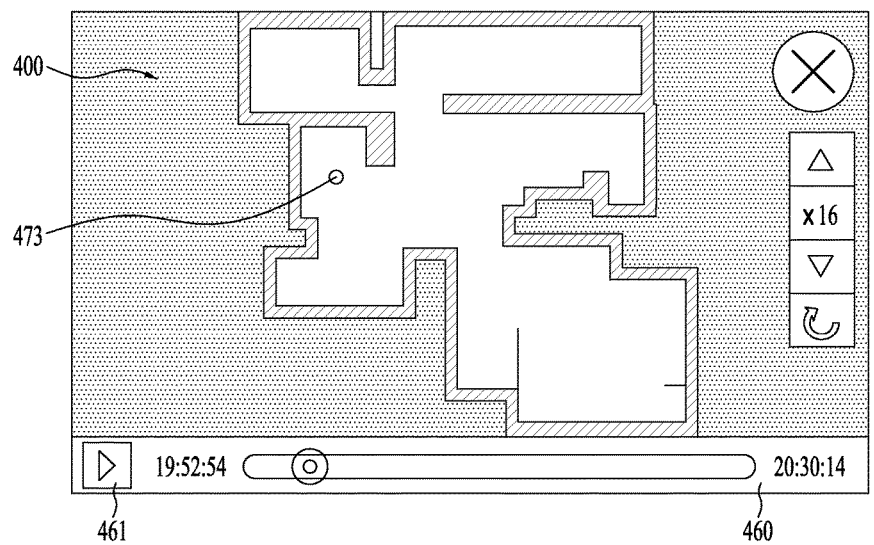
FIG. 14 is one example of a screen displaying a whole area of the map shown in FIG. 13.

FIG. 14 is one example of a screen displaying a whole area of the map shown in FIG. 13.

According to this embodiment, it may be checked that a cleaning area cleaned by the robot cleaner and a moving path of the robot cleaner in the cleaning area may be played as a video file, as well as information on the start and end of the cleaning.

In other words, the visual and sequential cleaning history information not provided by the robot cleaner itself may be figured out through the display of the external terminal, such that the robot cleaner having an improved reliability and the robot cleaner system including the robot cleaner may be provided.

Meanwhile, the plurality of the cleaning history lists and the playing of the specific cleaning history video file through the lists are described.

In many instances, the user may figure out only the latest cleaning history. Accordingly, only the latest cleaning history not the former cleaning history after executing the application may be checked.

FIG. 11 illustrates a widget screen 420 displaying current state information of the robot cleaner. The user touches or moves the widget screen 420 on the display, only to check the latest cleaning history.

Figure 15:
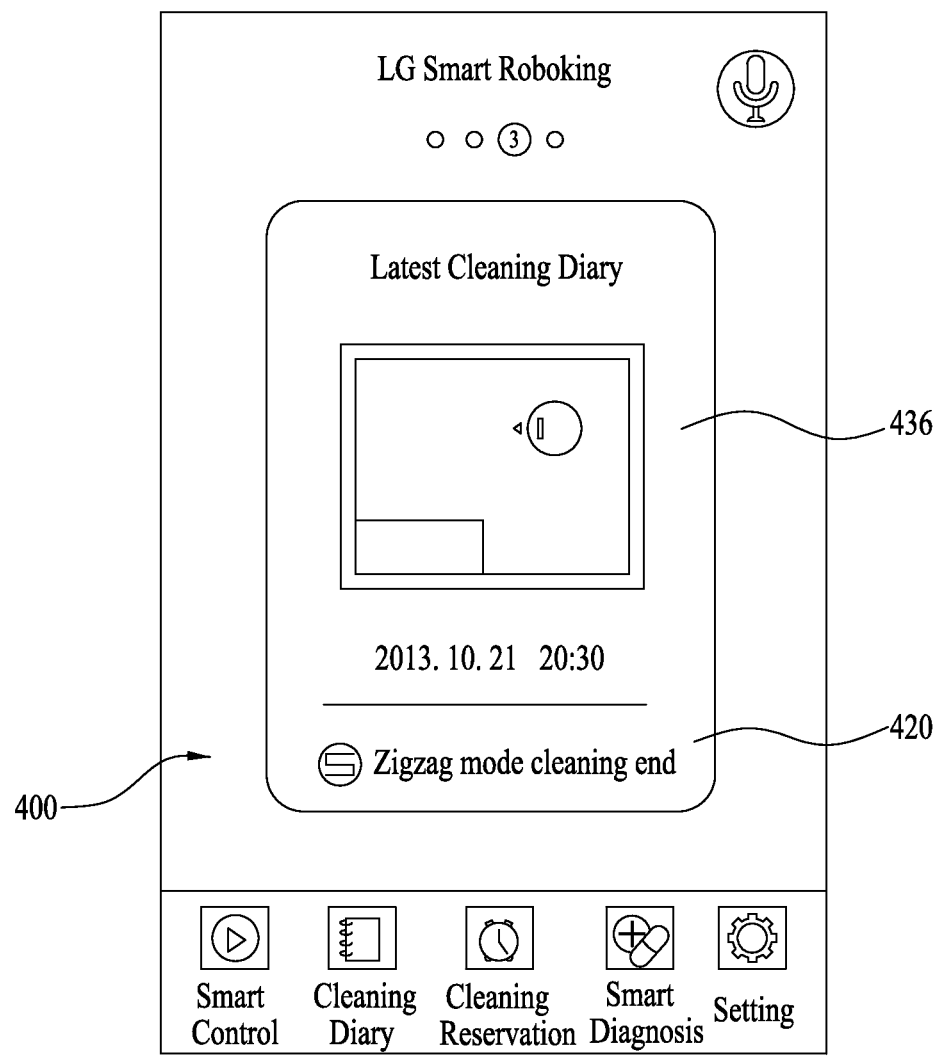
FIG. 15 is one example of a screen converted after a widget screen shown in FIG. 11 is selected.

For example, when the user touches and moves the widget screen 420 shown in FIG. 11 to a preset portion, a widget screen 436 shown in FIG. 15 may be displayed. As shown in FIG. 15, the widget screen 436 may be displayed to display the latest cleaning history information. Touching of the widget screen 420 shown in FIG. 11 is to ask the robot cleaner for an individual list corresponding to the latest cleaning history. Based on the request, bibliographic information may be displayed on the widget screen 436 shown in FIG. 15.

When the user activates the widget screen 436 shown in FIG. 15 by touching, a map file and a moving path file corresponding to the latest cleaning history is requested and the current screen may be converted into a playing screen shown in FIG. 13. The map and the moving path of the latest cleaning history may be played on the playing screen.

Accordingly, the case requesting the plurality of cleaning history lists and the case requesting one cleaning history list may be distinguishably displayed on the external terminal, such that diverse user's demands may be satisfied. The request for the bibliographic information and the map file or the moving path file may be performed individually. The time taken to receive the unnecessary files may be reduced. Only when the user wishes to play the video file, the requesting, receiving and playing of the files corresponding to the video file may be performed.

Meanwhile, in the conventional robot cleaner system, it is difficult for the user to figure out whether the robot cleaner cleans the cleaning area equally and effectively. The user can check the cleaning of the robot cleaner, while following the robot cleaner and it is quite a troublesome work. Accordingly, the cleaning map and the moving path of the robot cleaner may be played as a video file and the video file may be played at various speeds, which enables the cleaning history figured out visually and easily.

Exemplary embodiments of the present disclosure provide a robot cleaner and overcome the disadvantages of the robot cleaner and the robot cleaner system mentioned above.

Exemplary embodiments of the present disclosure also provide a robot cleaner of which a cleaning history (e.g., an area where the robot cleaner cleaned and a moving path of the robot cleaner) may be easily figured out by a user and a robot cleaner system including the same.

Exemplary embodiments of the present disclosure also provide a robot cleaner of which a cleaning history may be recognized by the user visually and which plays a video file type cleaning history to enhance user satisfaction, and a robot cleaner system including the same.

Exemplary embodiments of the present disclosure also provide a robot cleaner which may be used conveniently with no auxiliary device for wireless communication except a cleaner and an external terminal, regardless of an installation environment, and a robot cleaner system including the same.

Exemplary embodiments of the present disclosure also provide a robot cleaner which may be located near the user for improved security and a robot cleaner system including the same.

Exemplary embodiments of the present disclosure also provide a robot cleaner which may be easily controlled via an external terminal, with easy realization and easy production processes, and a robot cleaner system including the same.

Exemplary embodiments of the present disclosure also provide a robot cleaner which may perform communication connection with an external terminal for the user to control the robot cleaner via communication there between, and a robot cleaner system including the same.

Exemplary embodiments of the present disclosure also provide a robot cleaner which includes a communication module as a prerequisite for communication for control and which may be realized easily, with easy usage, and a robot cleaner system including the same.

Exemplary embodiments of the present disclosure also provide a control method for realizing the robot cleaner and the robot cleaner system.

To achieve these objects and other advantages and in accordance with the purpose of the disclosure, as embodied and broadly described herein, a robot cleaner includes a case; a suction device provided in the case; a suction nozzle for sucking dust from a floor by driving of the suction device; a dust collection device for collecting foreign substances contained in the air sucked via the suction nozzle; a driving unit for allowing the case to drive automatically; a controller for controlling the driving of the suction device and the driving unit, and for generating cleaning history information comprising map information on a cleaning area and moving path information; a memory unit for storing the cleaning history information; and a wireless communication module provided in the case to transmit the cleaning history information to the external terminal, when the external terminal asks the cleaning history information.

The map information on the cleaning area and the moving path information may be generated by a main controller or a vision controller. Such the cleaning history information may be generated as a list type.

The cleaning history information may include bibliographical information for distinguishing a series of cleanings from start to end of the cleanings from other cleanings. The bibliographical information may include at least one of a cleaning date, a cleaning start time, a cleaning end time and a cleaning mode.

The user may figure out the cleaning history only after looking at the bibliographical information simply and distinguish a plurality of individual cleanings from each other. The robot cleaner may repeat start and end of the cleaning several times a day.

A plurality of individual lists may be formed and stored in chronological order.

A preset number of individual lists may be stored and the oldest individual list is replaced by the latest individual list to store the latest one.

The robot cleaner may start to record the cleaning history information when the cleaning starts, and the robot cleaner may generate and store the individual list based on the recorded cleaning information when the cleaning ends normally.

The normal ending of the cleaning may mean restituting of the robot cleaner to a recharging base after the cleaning.

The normal ending of the cleaning may mean restituting of the robot cleaner after charging a battery The normal ending of the cleaning may mean external inputting of the cleaning ending.

The robot cleaner may not generate the individual list when the cleaning ends abnormally.

The robot cleaner may generate and store a map file storing map information on a cleaning area for each of the individual lists and a moving path file storing moving path information. In other words, separately from the individual list, the map file and the moving path file may be generated and stored. The individual list has to be mapped with the corresponding map file and moving path file.

The robot cleaner may separately perform the transmission of the individual list and the transmission of the moving path file.

The wireless communication module may include a Wi-Fi module provided with Access Point (AP) by the robot cleaner. The robot cleaner may further include a NFC module provided in the case to provide AP information to the external terminal for access to the AP via NFC communication.

Exemplary embodiments of the present disclosure may also provide a control method of a robot cleaner including transmitting AP information of a Wi-Fi module embedded in a case of the robot cleaner to an external terminal via NFC module; allowing the external terminal to access to the AP based on the AP information received from the external terminal; and Wi-Fi communicating with the external terminal via the AP, wherein the communicating step includes receiving a request for cleaning history information from the external terminal; transmitting the cleaning history information to the external terminal, the cleaning history information comprising map information on a cleaning area and moving path information of the robot cleaner.

The cleaning history information may include bibliographical information for distinguishing a series of cleanings from start to end of the cleanings from other cleanings, and the transmission of the individual list and the transmission of the moving path file may be separately performed by an individual request of the external terminal.

The robot cleaner may receive a request of the external terminal for map information and moving path information corresponding specific bibliographical information.

Exemplary embodiments of the present disclosure may also provide a control method of a robot cleaner system comprising a robot cleaner and an external terminal for wirelessly communicating with the robot cleaner, the control method including connecting the external terminal with the robot cleaner wirelessly; allowing the external terminal to ask the robot cleaner for cleaning history information; transmitting the cleaning history information comprising map information on a cleaning area and moving path information of the robot cleaner to the external terminal; and displaying a map on the external display and realizing a moving path of the robot cleaner visually and sequentially, based on the received cleaning history information.

The realization may be performed as playing of a video file and menus for selecting video play speed adjustment, video playing and video pausing may be displayed on the external terminal. In other words, it may be realized similar or equal to a screen playing a conventional video file such that the user may uses a video file play screen easily and intuitively.

In the connecting step, state information of the robot cleaner may be transmitted to the external terminal, and after the connecting step, the state information of the robot cleaner may be displayed on a widget type initial screen of the external terminal.

The latest cleaning history may be realized when the widget is selected.

After the connecting step, a cleaning diary menu may be displayed on an initial screen to ask the robot cleaner for a cleaning history file.

A plurality of cleaning histories may be realizable when the cleaning diary menu is selected.

Accordingly, in case of checking the latest cleaning history and in case of checking the plurality of the latest cleaning histories may be corresponding.

In other words, after the connecting step, a menu for playing only the latest cleaning history and a menu for playing a plurality of cleaning histories may be displayed simultaneously. At this time, the menu for playing only the latest cleaning history may be displayed as a widget to be distinguished from the cleaning diary menu mentioned above.

The user's various demands may be satisfied and then too much unnecessary data transmission may be prevented.

Exemplary embodiments of the present disclosure may also provide a robot cleaner system including a robot cleaner for generating and storing cleaning history information comprising map information on a cleaning area and moving path information; and a mobile terminal for asking the robot cleaner for the cleaning history information, for displaying a map based on the received cleaning history information and for realizing a moving path of the robot cleaner on the map visually and sequentially.

The cleaning history information may include bibliographic information for distinguishing a series of cleanings from start to end of the cleanings from other cleanings, and the mobile terminal asks and receives the bibliographical information, and asks and receives the map information and moving path information corresponding to specific bibliographical information individually to realize the received information.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

Exemplary embodiments of the present disclosure also provide a robot cleaner of which a cleaning history (e.g., an area where the robot cleaner cleaned and a moving path of the robot cleaner) may be easily figured out by a user and a robot cleaner system including the same.

Exemplary embodiments of the present disclosure also provide a robot cleaner of which a cleaning history may be recognized by the user visually and which plays a video file type cleaning history to enhance user satisfaction, and a robot cleaner system including the same.

Exemplary embodiments of the present disclosure also provide a robot cleaner which may be used conveniently with no auxiliary device for wireless communication except a cleaner and an external terminal, regardless of an installation environment, and a robot cleaner system including the same.

Exemplary embodiments of the present disclosure also provide a robot cleaner which may be located near the user for improved security and a robot cleaner system including the same.

Exemplary embodiments of the present disclosure also provide a robot cleaner which may be easily controlled via an external terminal, with easy realization and easy production processes, and a robot cleaner system including the same.

Exemplary embodiments of the present disclosure also provide a robot cleaner which may perform communication connection with an external terminal for the user to control the robot cleaner via communication there between, and a robot cleaner system including the same.

Exemplary embodiments of the present disclosure also provide a robot cleaner which includes a communication module as a prerequisite for communication for control and which may be realized easily, with easy usage, and a robot cleaner system including the same.

Exemplary embodiments of the present disclosure also provide a control method for realizing the robot cleaner and the robot cleaner system.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot cleaner comprising:
   a case;
   a suction device provided in the case;
   a suction nozzle configured to suck dust from a floor by driving of the suction device;
   a dust collection device for collecting foreign substances contained in the air sucked via the suction nozzle;
   a drive module including wheels to allow movement;
   a controller configured to control the driving of the suction device and the drive module, and configured to generate cleaning history information, the cleaning history information including map information on a cleaning area and moving path information;
   a memory configured to store the cleaning history information; and
   a wireless communication module provided in the case and configured to transmit the cleaning history information to an external terminal when the robot cleaner receives a signal requesting cleaning history information transmitted from an external terminal,
   wherein the cleaning history information includes bibliographical information for distinguishing a series of cleanings from start to end of the cleanings from other cleanings,
   wherein the robot cleaner creates the bibliographical information as an individual list, wherein a preset number of individual lists are stored in a chronological order, and a new individual list replaces an oldest individual list for storage when the preset number has been reached.

2. The robot cleaner of claim 1, wherein the bibliographical information includes at least one of a cleaning date, a cleaning start time, a cleaning end time and a cleaning mode.

3. The robot cleaner of claim 1, wherein the robot cleaner starts to record the cleaning history information when the cleaning starts, and
   the robot cleaner stores the individual list based on the recorded cleaning information when the cleaning ends normally.

4. The robot cleaner of claim 3, wherein the normal ending of the cleaning comprises at least one of restituting of the robot cleaner to a recharging base after the cleaning, restituting of the robot cleaner after charging a battery and external inputting of the cleaning ending.

5. The robot cleaner of claim 1, wherein the individual list is not stored by the robot cleaner when the cleaning ends abnormally.

6. The robot cleaner of claim 1, wherein the robot cleaner stores a map file corresponding to a map information on a cleaning area for each of the individual lists and a moving path file corresponding to the moving path information.

7. The robot cleaner of claim 6, wherein the robot cleaner transmits the individual list and the moving path file separately.

8. The robot cleaner of claim 1, wherein the wireless communication module comprises a Wi-Fi module provided with an Access Point (AP) by the robot cleaner.

9. The robot cleaner of claim 8, further comprising:
   an NFC module provided in the case to provide an AP (Access Point) information to an external terminal via NFC communication for access to the AP.

10. A robot cleaner system comprising:
    a robot cleaner configured to provide cleaning history information including map information of a cleaning area and moving path information; and
    a mobile terminal configured to wirelessly communicate with the robot cleaner, to request the robot cleaner for the cleaning history information, to display a map based on the received cleaning history information and to display a sequential moving path of the robot cleaner on the displayed map,
    wherein the robot cleaner transmits the cleaning history information to the mobile terminal when the robot cleaner receives, from the mobile terminal, a signal requesting cleaning history information,
    wherein the cleaning history information includes bibliographical information for distinguishing a series of cleanings from start to end of the cleanings from other cleanings, and
    wherein the robot cleaner creates the bibliographical information as an individual list, wherein a preset number of individual lists are stored in a chronological order, and a new individual list replaces an oldest individual list for storage when the preset number has been reached.

* * * * *